US011307813B2

(12) United States Patent
Nakagoshi

(10) Patent No.: US 11,307,813 B2
(45) Date of Patent: Apr. 19, 2022

(54) RECOVERY CONTROL DEVICE IN IMAGE FORMING SYSTEM, CONTROL METHOD THEREOF, AND NON-TRANSITORY RECORDING MEDIUM

(71) Applicant: KYOCERA Document Solutions Inc., Osaka (JP)

(72) Inventor: Yusuke Nakagoshi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/785,780

(22) Filed: Feb. 10, 2020

(65) Prior Publication Data

US 2020/0264812 A1 Aug. 20, 2020

(30) Foreign Application Priority Data

Feb. 18, 2019 (JP) .............................. JP2019-026478
Feb. 18, 2019 (JP) .............................. JP2019-026479

(51) Int. Cl.
*G06F 3/12* (2006.01)

(52) U.S. Cl.
CPC ............ *G06F 3/121* (2013.01); *G06F 3/1229* (2013.01); *G06F 3/1273* (2013.01)

(58) Field of Classification Search
CPC ...... G06F 3/121; G06F 3/1229; G06F 3/1273; G06F 3/1231; G06F 3/1234; G06F 3/1284; G06F 11/0733; G06F 11/0751; G06F 11/0757; G06F 11/0793; G06F 3/1293; G06F 3/1294; G03G 15/55; H04N 1/00084; H04N 2201/0094; H04N 2201/3202; H04N 1/00029; H04N 1/0005; H04N 1/00002; H04N 1/00007; H04N 1/00055

USPC ......................................................... 358/1.15
See application file for complete search history.

(56) References Cited

U.S. PATENT DOCUMENTS

| 9,819,813 B2* | 11/2017 | Nakazato ........... H04N 1/00037 |
| 2013/0019128 A1* | 1/2013 | Yamasaki ........... G06F 11/0775 714/45 |
| 2017/0353615 A1* | 12/2017 | Hasegawa ............. G06F 3/1285 |
| 2017/0357372 A1* | 12/2017 | Morimoto ........... G06F 3/04186 |
| 2018/0137007 A1 | 5/2018 | Hayashi |

FOREIGN PATENT DOCUMENTS

| CN | 107807861 | 3/2018 |
| EP | 1231766 | 8/2002 |
| JP | 2001344159 | 12/2001 |
| JP | 2004-248256 | 9/2004 |
| JP | 2012118229 | 6/2012 |
| JP | 2012118229 A * | 6/2012 |

OTHER PUBLICATIONS

EPO, European Search Report, Application No. of 20156596.7, dated Aug. 20, 2020.

* cited by examiner

*Primary Examiner* — Kent Yip
(74) *Attorney, Agent, or Firm* — Lex IP Meister, PLLC

(57) ABSTRACT

An image forming system for forming an image includes a storage unit that stores a log of the image forming system, and a controller to detect an abnormality of the image forming system based on the content of the log stored in the storage unit, and the controller controls to execute a recovery process of the image forming system according to a detection result of the abnormality. In this configuration, the image forming system detects complicated abnormality that occurs according to series of flows.

15 Claims, 24 Drawing Sheets

RECOVERY CONTROL DEVICE IN IMAGE FORMING SYSTEM, CONTROL METHOD THEREOF, AND NON-TRANSITORY RECORDING MEDIUM

INCORPORATION BY REFERENCE

This Application is based upon, and claims the benefit of priority to Japanese Patent Application No. 2019-026478 filed on Feb. 18, 2019 and Japanese Patent Application No. 2019-026479 filed on Feb. 18, 2019, the entire contents of which are hereby incorporated herein by reference.

BACKGROUND

Field of the Invention

The present disclosure relates to an image forming system for forming an image, a method for controlling the same, and a recording medium.

Description of the Related Art

Japanese Unexamined Patent Application Publication No. 2004-248256 discloses notifying a service call (SC), when the occurrence of abnormality is detected based on a detection value of a sensor in an image forming apparatus as a conventional image forming apparatus.

SUMMARY

The disclosure is directed to an image forming system capable of detecting a complex abnormality generated according to a series of flows.

According to an aspect of the disclosure, an image forming system for forming an image includes a storage unit configured to store a log of the image forming system, and a controller configured to detect an abnormality of the image forming system based on the content of the log stored in the storage unit. The controller controls to execute a recovery process of the image forming system according to a detection result of the abnormality.

According to still another aspect of the disclosure, a method of controlling an image forming system that forms an image stores a log of the image forming system in a storage unit, detects an abnormality of the image forming system based on the content of the log stored in the storage unit, and controls to execute a recovery process of the image forming system according to a detection result of the abnormality.

According to still another aspect of the disclosure, in an image forming system that forms an image including a storage unit that stores a log, a program causes a computer to function as a controller that detects an abnormality of the image forming system based on the content of the log stored in the storage unit and controls to execute a recovery process of the image forming system according to a detection result of the abnormality. Further, in an image forming system that forms an image including a storage unit that stores a log, a computer-readable recording medium stores a program causing a computer to function as a controller that detects an abnormality of the image forming system based on the content of the log stored in the storage unit and controls to execute a recovery process of the image forming system according to a detection result of the abnormality.

DETAILED DESCRIPTION

Hereinafter, embodiments of the present disclosure will be described with reference to the drawings.

First, the configuration of an image forming system according to a first embodiment of the present disclosure will be described.

Figure 1:
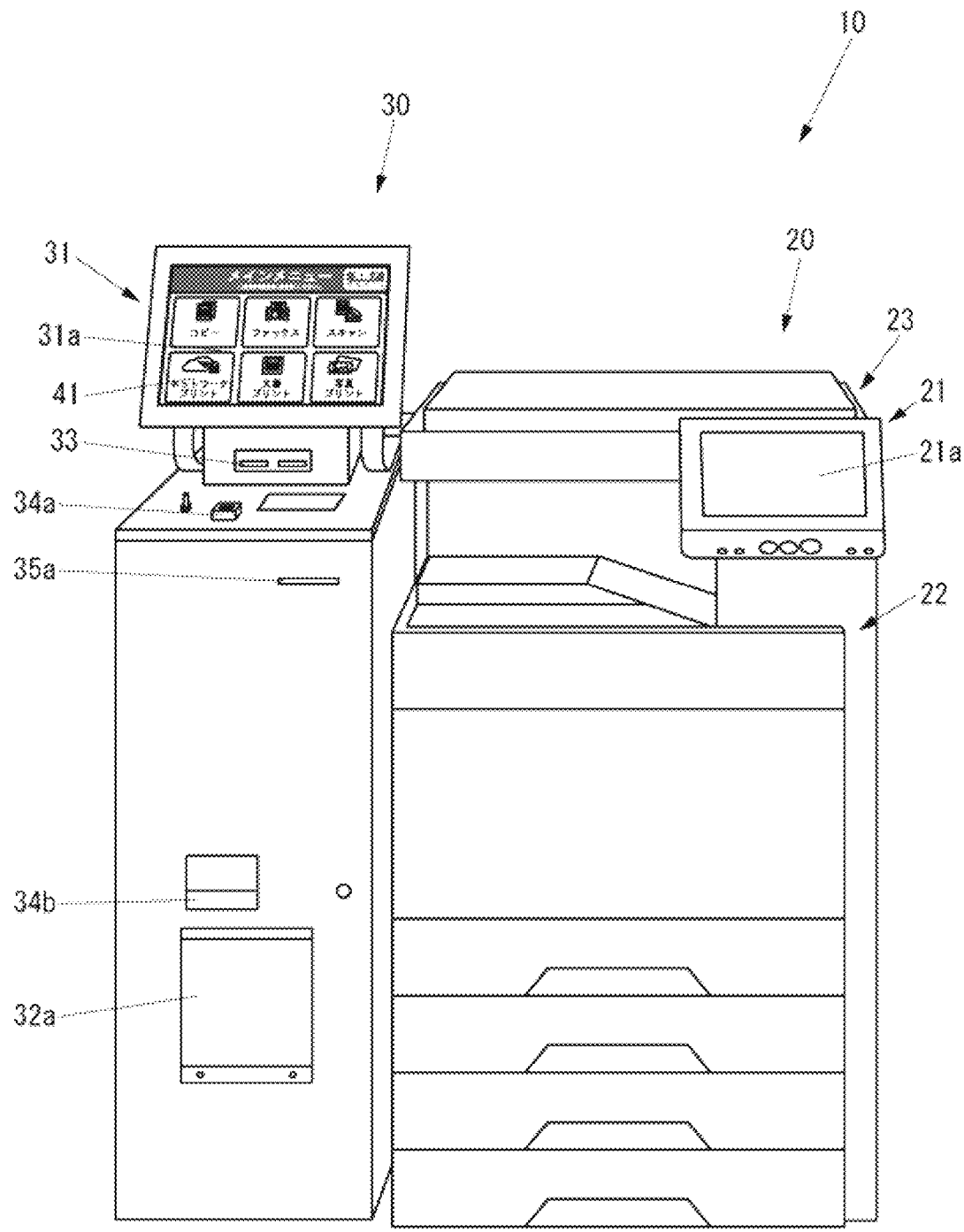
FIG. 1 is an external perspective view of an image forming system according to a first embodiment of the disclosure.

FIG. 1 is an external perspective view of an image forming system 10 according to the present embodiment.

As shown in FIG. 1, the image forming system 10 includes a multifunction peripheral (MFP) 20 as an image forming apparatus and a kiosk terminal 30 as a function reinforcing device for reinforcing the functions of the MFP 20. The MFP 20 and the kiosk terminal 30 are arranged adjacent to each other. The image forming system 10 is placed, for example, in a retail store such as a convenience store.

The MFP 20 and the kiosk terminal 30 are connected to each other via a local area network (LAN) so as to be able to communicate with each other. The status where the MFP 20 and the kiosk terminal 30 are not connected to each other includes, for example, a status in which a LAN cable for connecting the MFP 20 and the kiosk terminal 30 is not connected to at least one of the MFP 20 and the kiosk terminal 30, a status in which at least one of the MFP 20 and the kiosk terminal 30 is powered off, a status in which application software for controlling the communication between the MFP 20 and the kiosk terminal 30 is not operating on at least one of the MFP 20 and the kiosk terminal 30, and the like.

Figure 2:
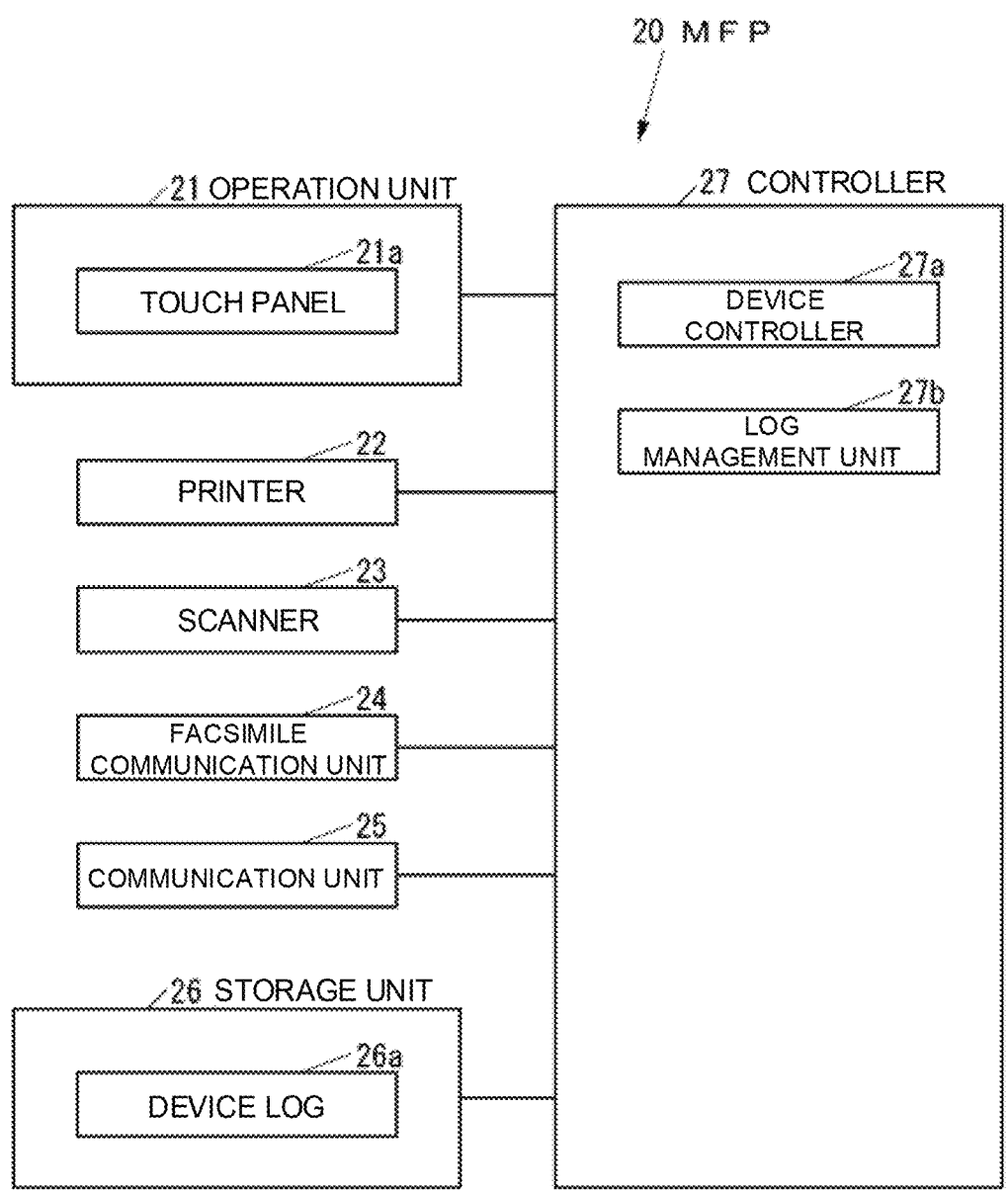
FIG. 2 is a block diagram of a multifunctional peripheral (MFP) shown in FIG. 1.

FIG. 2 is a block diagram of the MFP 20.

As shown in FIGS. 1 and 2, the MFP 20 includes an operation unit 21 which is an operation device such as a button to which various operations are input, a printer 22 that is a printing device that prints an image on a recording medium such as paper, and a scanner 23 that is a reading device that reads an image from a document. The MFP 20 further includes a facsimile communication unit 24 which is a facsimile device for performing facsimile communication with an external facsimile apparatus (not shown) via a communication line such as a public telephone line, and a communication unit 25 that is a communication device that communicates with an external device via a network such as a LAN or the Internet, or directly via wired or wireless without intervening the network. The MFP 20 further includes a storage unit 26 that is a non-volatile storage device such as a semiconductor memory and a hard disk drive (HDD) that stores various types of information, and a controller 27 that controls the entire MFP 20.

The operation unit 21 includes a touch panel 21a for displaying various information and inputting various operations.

The storage unit 26 can store a device log 26a which is a log of various devices in the MFP20, such as the operation unit 21, the printer 22, and the scanner 23. Note that the log is a text indicating a record such as "the screen has been touched", "the process of XX starts", and "the state has changed to XX".

The controller 27 includes, for example, a central processing unit (CPU), a read only memory (ROM) storing programs and various kinds of data, and a random access memory (RAM) as a memory used as a working area of the CPU in the controller 27. The CPU in the controller 27 executes a program stored in the storage unit 26 or the ROM in the controller 27.

The controller 27 executes a program stored in the storage unit 26 or the ROM in the controller 27, to realize a device controller 27a for controlling various devices in the MFP 20 such as the operation unit 21, the printer 22, and the scanner 23, and a log management unit 27b for managing the device log 26a. The log management unit 27b can transmit at least a part of the device log 26a to the kiosk terminal 30 by, for example, the Syslog protocol.

Figure 3:
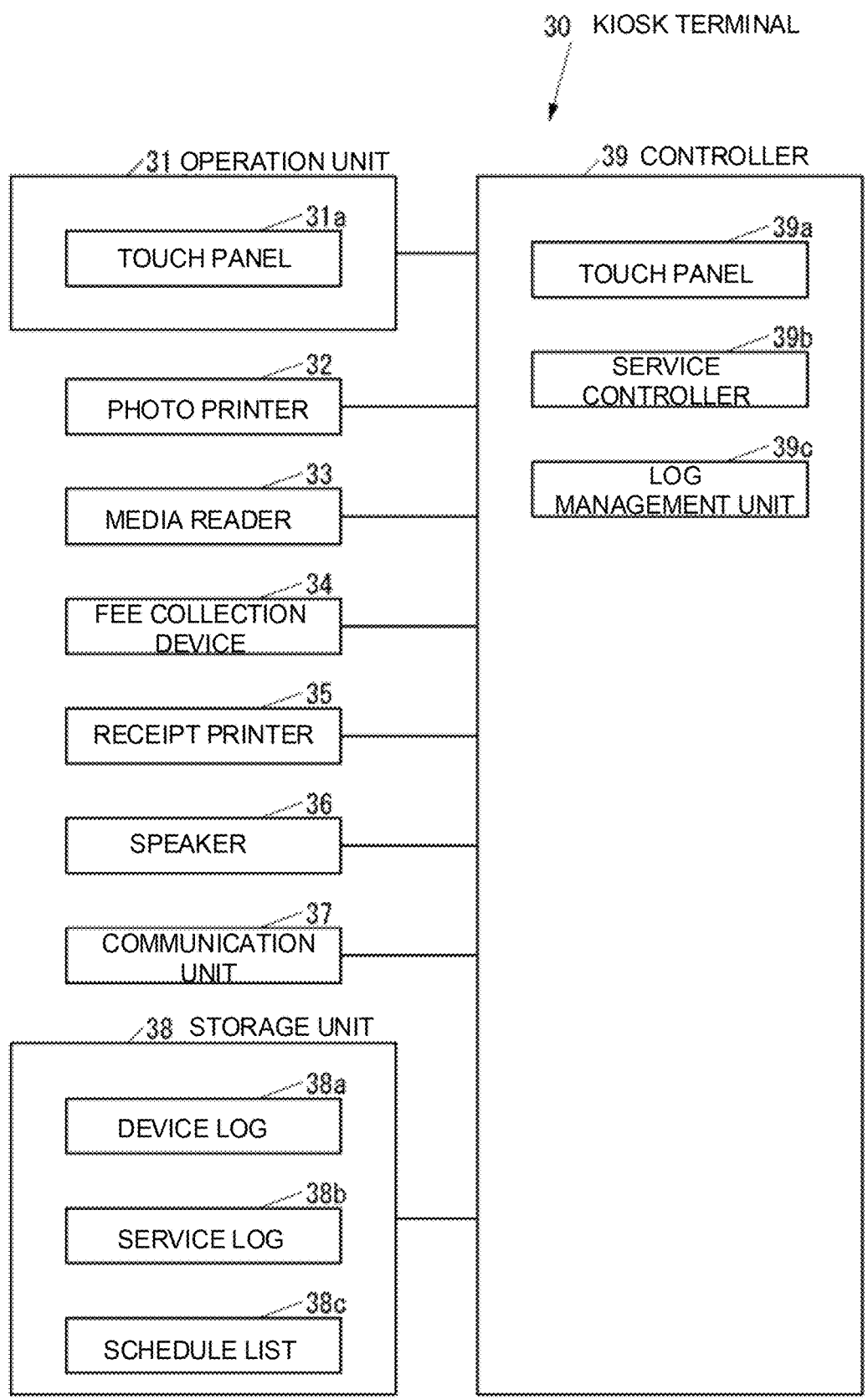
FIG. 3 is a block diagram of a kiosk terminal shown in FIG. 1.

FIG. 3 is a block diagram of the kiosk terminal 30.

As shown in FIGS. 1 and 3, the kiosk terminal 30 includes an operation unit 31 which is an operation device to which various operations are input, a photo printer 32 which is a printing device for printing a photo, a media reader 33 which communicates with an external storage medium such as a universal serial bus (USB) memory, and a fee collection device 34 for collecting a usage fee for the image forming system 10. The kiosk terminal 30 further includes a receipt printer 35 that is a printing device for printing a receipt of the usage fee collected by the fee collection device 34, a speaker 36, and a communication unit 37 which is a communication device for communicating with an external device via a network such as a LAN or the Internet, or directly via wired or wireless without intervening the network. The kiosk terminal 30 further includes a storage unit 38 which is a non-volatile storage device such as a semiconductor memory and an HDD for storing various kinds of information, and a controller 39 which controls the entire kiosk terminal 30.

The operation unit 31 includes a touch panel 31a for displaying various kinds of information and inputting various kinds of operations.

The screen size of the touch panel 31a in the kiosk terminal 30 is larger than the screen size of the touch panel 21a in the MFP 20.

The image forming system 10 shown in FIG. 1 can provide various services responsive to an operation on a main menu screen 41 displayed on the touch panel 31a. For example, the image forming system 10 provides a "copy" service for printing by the printer 22 an image read from a document by the scanner 23, and a "facsimile" service in which an image read from a document by the scanner 23 is facsimile-transmitted by the facsimile communication unit 24 (see FIG. 2). The image forming system 10 further provides a "scan" service for saving an image read from a document by the scanner 23 to an external storage medium such as a USB memory via the media reader 33, and a "network print" service for receiving data managed by an external data management system (not shown) via the communication unit 37 (see FIG. 3) and the communication unit 25 (see FIG. 2) and printing by the printer 22 or the photo printer 32 (see FIG. 3) based on the received data. The image forming system 10 further provides a "document print" service for printing a document by the printer 22 based on document data, which is obtained from an external storage medium such as a USB memory via the media reader 33, or externally obtained by wireless from at least one of the communication unit 25 and the communication unit 37. The image forming system 10 further provides a "photo print" service for printing a photo by the photo printer 32, based on image data, which is obtained from an external storage medium such as a USB memory via the media reader 33, or externally obtained by wireless from at least one of the communication unit 25 and the communication unit 37. The image forming system 10 can further provide a "maintenance" service for maintaining the MFP 20 responsive to a special operation on the touch panel 21a.

The photo printer 32 includes a photo outlet 32a for discharging a printed photo.

The fee collection device 34 includes a coin insertion port 34a for inserting coins, and a coin return port 34b for returning coins.

The receipt printer 35 includes a receipt outlet 35a for discharging a printed receipt.

The storage unit 38 can store a device log 38a that is a log of various devices in the image forming system 10, such as the MFP 20, the operation unit 31, the photo printer 32, the fee collection device 34, and the speaker 36. The storage unit 38 can further store a service log 38b that is a log of various services in the image forming system 10, such as "copy", "facsimile", "scan", "network print", "document print", "photo print", and "maintenance".

The storage unit 38 can store a schedule list 38c indicating a schedule for executing processing.

The controller 39 includes, for example, a CPU, a ROM storing a program and various data, and a RAM as a memory used as a work area of the CPU in the controller 39. The CPU in the controller 39 executes a program stored in the storage unit 38 or the ROM in the controller 39.

The controller 39 executes a program stored in the storage unit 38 or the ROM in the controller 39 to realize a device controller 39a that controls various devices in the image forming system 10, such as the MFP 20, the operation unit 31, the photo printer 32, the fee collection device 34, and the speaker 36, a service controller 39b that controls various services in the image forming system 10, such as "copy", "facsimile", "scan", "network print", "document print", "photo print", and "maintenance", and a log management unit 39c that manages the device log 38a and the service log 38b. The log management unit 39c can add a log received from the MFP 20 by, for example, the Syslog protocol to the device log 38a.

In the image forming system 10, the touch panel 21a in the MFP 20 is not basically used. However, the MFP of the same model as the MFP 20 may be placed alone as well as a part of the image forming system. Therefore, the MFP 20 includes the touch panel 21a. Further, the MFP 20 may display a maintenance screen for maintaining the MFP 20 on the touch panel 21a responsive to a special operation on the touch panel 21a.

Next, the operation of the image forming system 10 will be described.

The image forming system 10 may not be able to use the MFP 20 from the kiosk terminal 30 due to an abnormality of the MFP 20, when a communication error occurs temporarily between the MFP 20 and the kiosk terminal 30, even after the communication error between the MFP 20 and the kiosk terminal 30 is resolved. In case that the MFP 20 cannot be used from the kiosk terminal 30 due to the abnormality of the MFP 20, the MFP 20 can be used from the kiosk terminal 30 by temporarily turning off the MFP 20 and turning it on again, that is, by normalizing the MFP 20 by restarting the MFP 20.

Here, the kiosk terminal 30 can execute an automatic recovery process which instructs the MFP 20 to restart and waits for the appearance of a log indicating a recovery signal from the MFP 20. Further, the kiosk terminal 30 can also guide the user to a manual recovery operation for manually restarting the MFP 20.

First, the operation of the kiosk terminal 30 when adding a schedule for executing the automatic recovery process or a schedule for guiding the manual recovery operation to the schedule list 38c or deleting at least one of the schedules from the schedule list 38c will be described.

Figure 4:
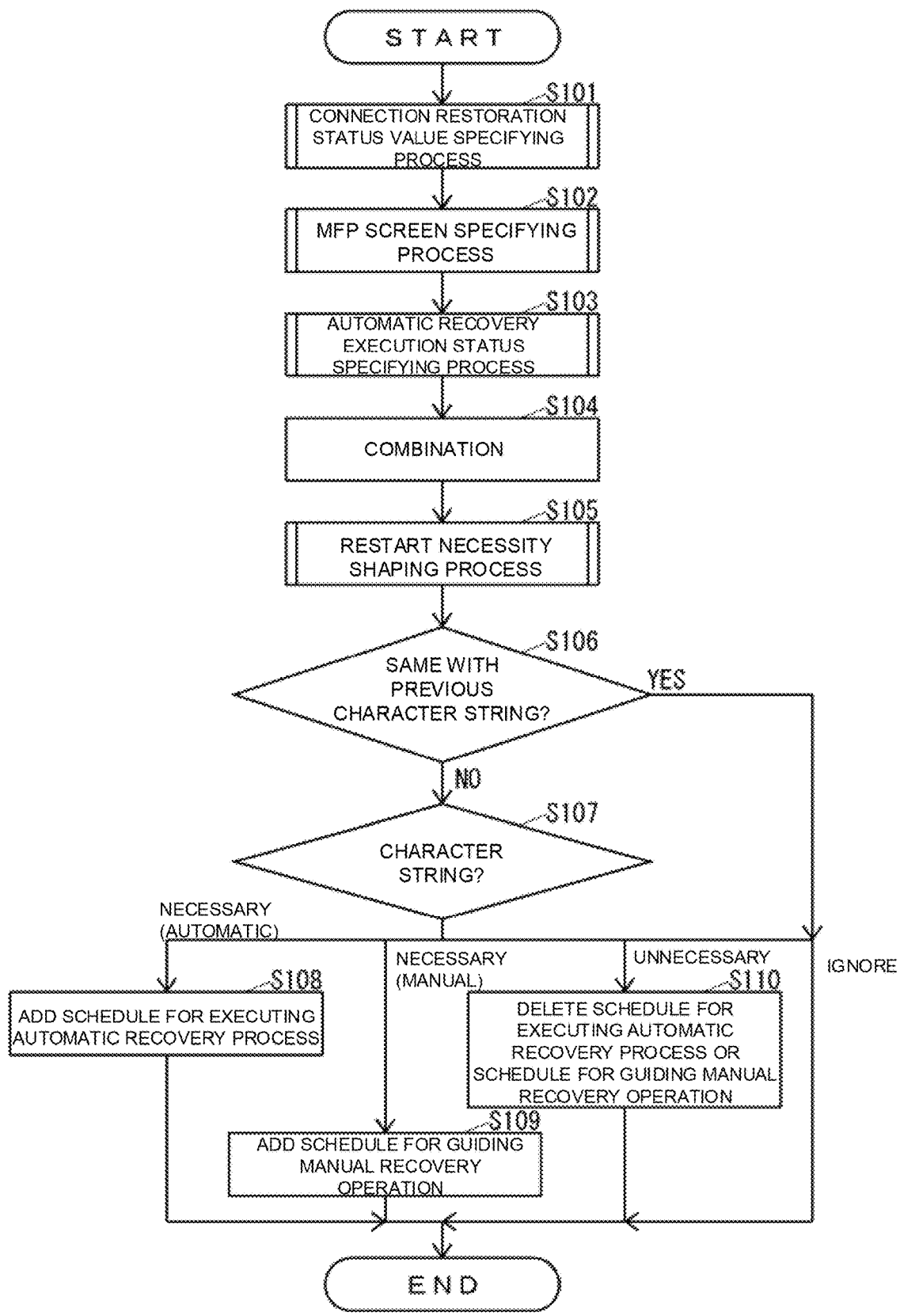
FIG. 4 is a flowchart of the operation of the kiosk terminal shown in FIG. 3 in the case of adding a schedule for executing an automatic recovery process or a schedule for guiding a manual recovery operation to a schedule list, or deleting the schedules from the schedule list.

FIG. 4 is a flowchart of the operation of the kiosk terminal 30 when adding a schedule for executing the automatic recovery process or a schedule for guiding the manual recovery operation to the schedule list 38c or deleting at least one of the schedules from the schedule list 38c.

The log management unit 39c executes the operation shown in FIG. 4 with respect to an increased log every time one log is increased on at least one of the device log 38a and the service log 38b.

As shown in FIG. 4, the log management unit 39c executes a connection restoration status value specifying process for specifying a connection status with the MFP 20 and a value indicating a restoration status of the MFP 20 (hereinafter, referred to as a "connection restoration status value") (S101).

Figure 5:
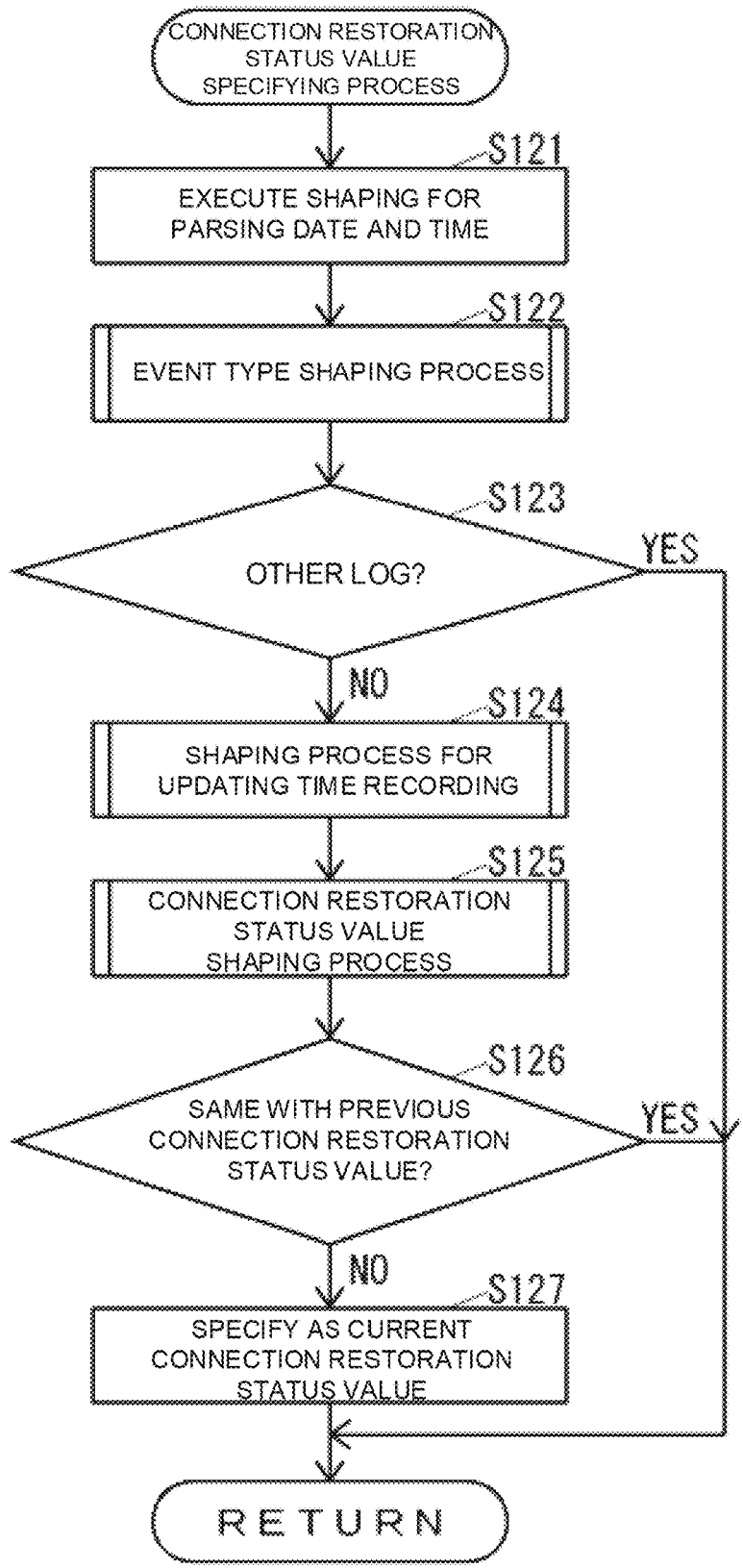
FIG. 5 is a flowchart of a connection restoration status value specifying process shown in FIG. 4.

FIG. 5 is a flowchart of the connection restoration status value specifying process shown in FIG. 4.

As shown in FIG. 5, the log management unit 39c executes shaping for parsing the date and time on the character string obtained by copying the target log (S121). For example, when the target log is a character string "2018/1/1 00:50:00 . . . }, the log management unit 39c generates a character string (2018/1/1 00:50:00, " . . . ") by the process of S121. Note that the specific content in the log is described in " . . . ".

After the process of S121, the log management unit 39c executes an event type shaping process on the character string generated in S121 to execute shaping for specifying the type of the event, that is, the type of the target log (S122).

Figure 6:
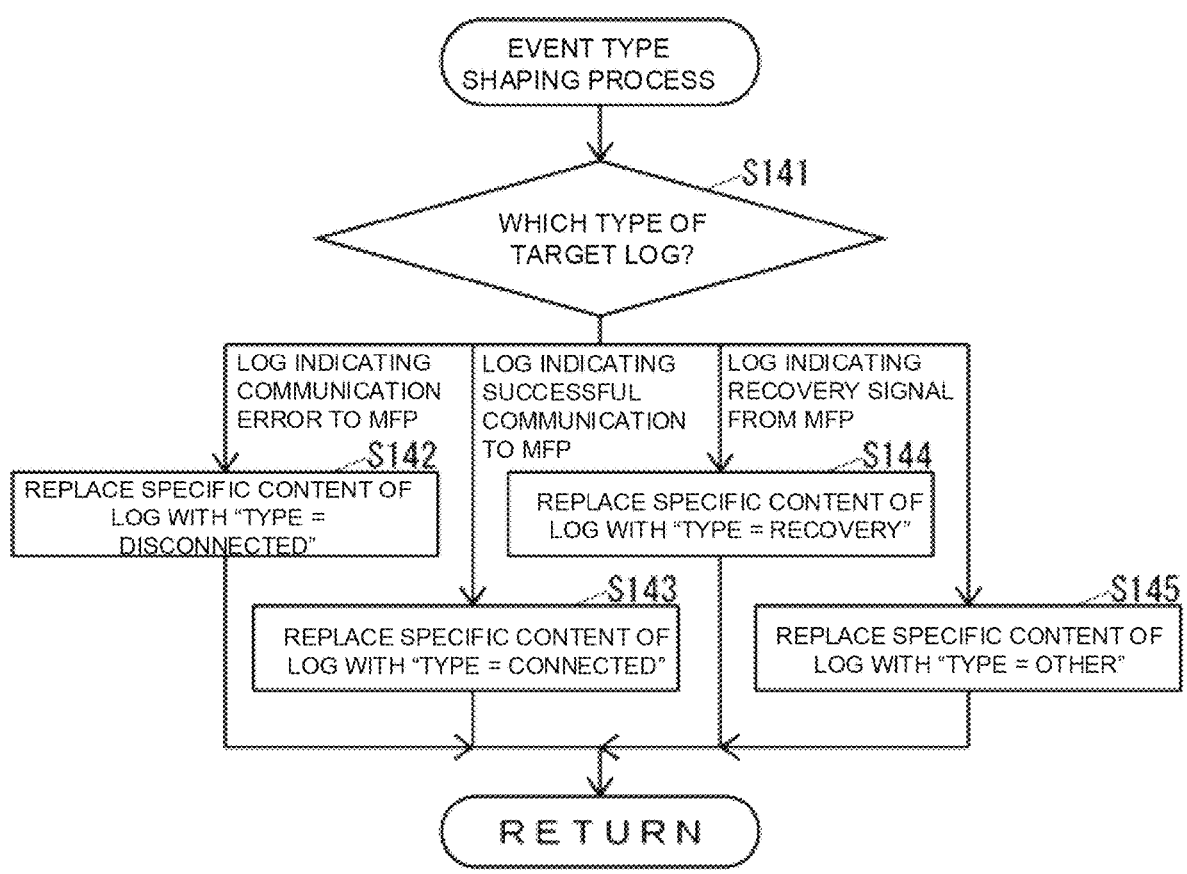
FIG. 6 is a flowchart of an event type shaping process shown in FIG. 5.

FIG. 6 is a flowchart of the event type shaping process shown in FIG. 5.

As shown in FIG. 6, the log management unit 39c determines the type of the target log based on the specific content of the log described in the target log (S141).

When the log management unit 39c determines in S141 that the type of the target log is a log indicating a communication error to the MFP 20, the log management unit 39c replaces the specific content of the log with "type=disconnected" in the character string generated in S121 (S142), and then ends the operation shown in FIG. 6.

When the log management unit 39c determines in S141 that the type of the target log is a log indicating successful communication to the MFP 20, the log management unit 39c replaces the specific content of the log with "type=connected" in the character string generated in S121 (S143), and then ends the operation shown in FIG. 6.

When the log management unit 39c determines in S141 that the type of the target log is a log indicating the recovery signal from the MFP 20, the log management unit 39c replaces the specific content of the log with "type=recovery" in the character string generated in S121 (S144), and then ends the operation shown in FIG. 6.

The log management unit 39c determines in S141 that the type of the target log is not any of the log indicating the communication error to the MFP 20, the log indicating the successful communication to the MFP 20, and the log indicating the recovery signal from the MFP 20, that is, the other log, the log management unit 39c replaces the specific content of the log with "type=other" in the character string generated in S121 (S145), and then ends the operation shown in FIG. 6.

For example, in case that the character string generated in S121 is (2018/1/1 00:50:00, " . . . "), when the log management unit 39c determines in S141 that the type of the target log is the log indicating the communication error to the MFP 20 based on the specific content of the log described in the target log, the log management unit 39c generates a character string of (2018/1/1 00:50:00, type=disconnected) in the process of S142.

As shown in FIG. 5, after the process of S122, the log management unit 39c determines whether the type of the target log is not any of the log indicating the communication error to the MFP 20, the log indicating the successful communication to the MFP 20, and the log indicating the recovery signal from the MFP 20, that is, whether the log is the other log (S123).

The log management unit 39c determines in S123 that the type of the target log is one of the log indicating the communication error to the MFP 20, the log indicating the successful communication to the MFP 20, and the log indicating the recovery signal from the MFP 20, that is, the type of the target log is not the other log, the log management unit 39c executes a time recording and updating shaping process for executing shaping for updating the time recording on the character string generated in S122 (S124).

Figure 7:
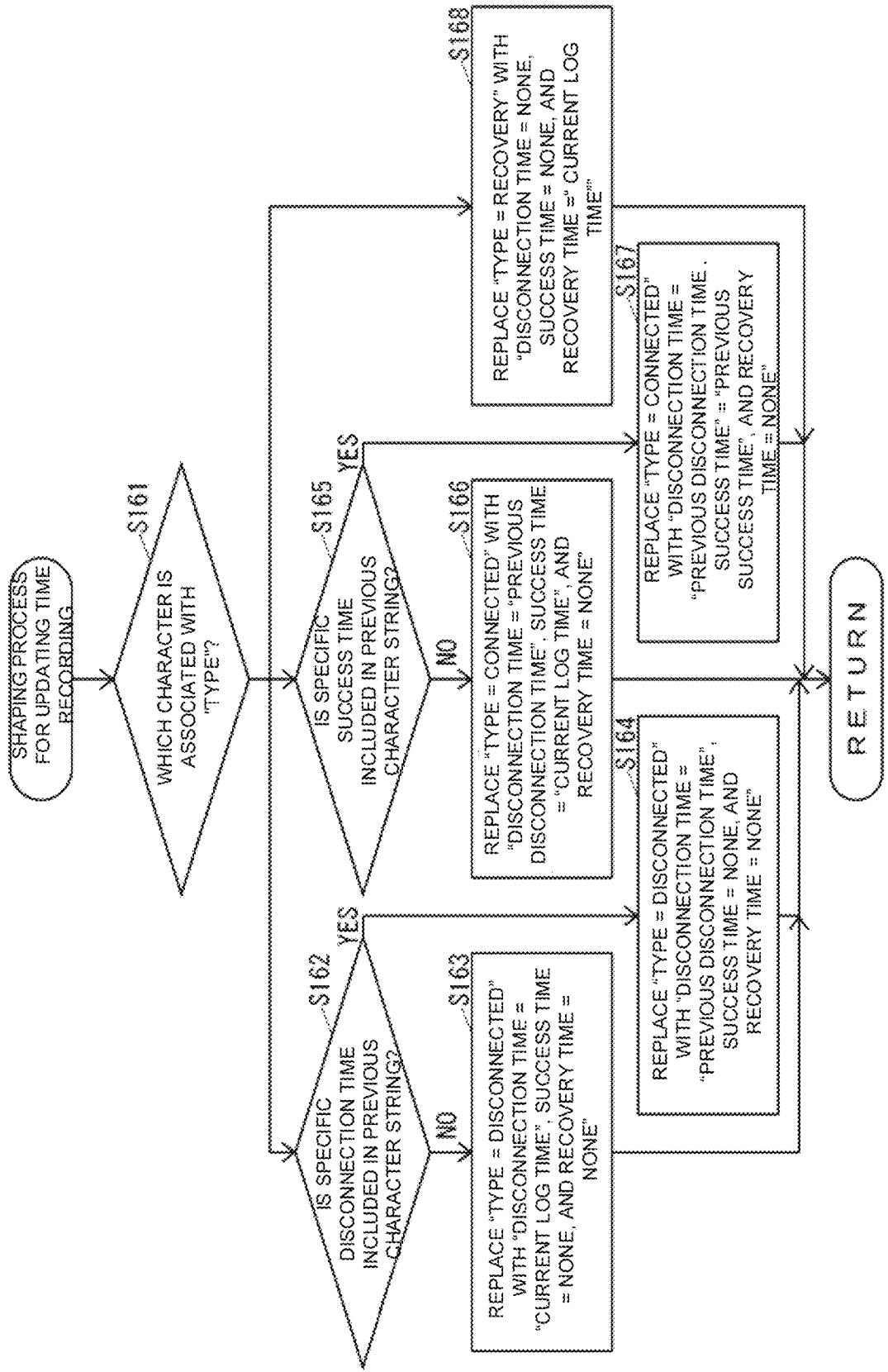
FIG. 7 is a flowchart of a time recording and updating shaping process shown in FIG. 5.

FIG. 7 is a flowchart of the time recording and updating shaping process shown in FIG. 5.

As shown in FIG. 7, the log management unit 39c determines a character associated with "type" in the character string generated in S122 (S161).

When the log management unit 39c determines in step S161 that the character string associated with "type" in the character string generated in S122 is "disconnected", that is, the character string generated in S122 includes "type=disconnected", the log management unit 39c determines whether a specific disconnection time is included in the character string generated in the previous time recording and updating shaping process (S162). Here, the disconnection time indicates a time when the communication with the MFP 20 is disconnected.

When the log management unit 39c determines in S162 that the character string generated in the previous time recording and updating shaping process does not include the specific disconnection time, the log management unit 39c replaces "type=disconnected" with "disconnection time="current log time", success time=none, and recovery time=none" in the character string generated in S122 (S163), and then ends the operation shown in FIG. 7. Here, the "current log time" is actually the time extracted in S121 of the current connection restoration status value specifying process. The success time indicates the time when some communication with the MFP 20 is normally executed. The recovery time indicates the time when the recovery signal from the MFP 20 is received.

When the log management unit 39c determines in S162 that the character string generated in the previous time recording and updating shaping process includes the specific disconnection time, the log management unit 39c replaces "type=disconnected" with "disconnection time="previous disconnection time", success time=none, and recovery time=none" in the character string generated in S122 (S164), and then ends the operation shown in FIG. 7. Here, the "previous disconnection time" is actually a specific disconnection time included in the character string generated in the previous time recording and updating shaping process.

When the log management unit 39c determines in S161 that the character associated with "type" in the character string generated in S122 is "connected", that is, "type=connected" is included in the character string generated in S122, the log management unit 39c determines whether a specific success time is included in the character string generated in the previous time recording and updating shaping process (S165).

When the log management unit 39c determines in S165 that the character string generated in the previous time recording and updating shaping process does not include the specific success time, the log management unit 39c replaces "type=connected" with "disconnection time="previous disconnection time", success time="current log time", and recovery time=none" in the character string generated in S122 (S166), and then ends the operation shown in FIG. 7. Here, when the character string generated in the previous time recording and updating shaping process includes the specific disconnection time, the "previous disconnection time" is actually the specific disconnection time. Further, when the string generated in the previous time recording and updating shaping process does not include the specific disconnection time, the "previous disconnection time" is actually "none". The "current log time" is actually the time extracted in S121 of the current connection restoration status value specifying process.

When the log management unit 39c determines in S165 that the character string generated in the previous time recording and updating shaping process includes the specific success time, the log management unit 39c replaces "type=connected" with "disconnection time="previous disconnection time, success time="previous success time", and recovery time=none" in the character string generated in S122 (S167), and then ends the operation shown in FIG. 7. Here, when the character string generated in the previous time recording and updating shaping process includes the specific disconnection time, the "previous disconnection time" is actually the specific disconnection time. Further, when the character string generated in the previous time recording and updating shaping process does not include the specific disconnection time, the "previous disconnection time" is actually "none". The "previous success time" is actually the specific success time included in the character string generated in the previous time recording and updating shaping process.

When the log management unit 39c determines in S161 that the character associated with "type" in the character string generated in S122 is "recovery", that is, the character string generated in S122 includes "type=recovery", the log management unit 39c replaces "type=recovery" with "disconnection time=none, success time=none, and recovery time="current log time" in the character string generated in S122 (S168), and then ends the operation shown in FIG. 7. Here, "current log time" is actually the time extracted in S121 of the current connection restoration status value specifying process.

As shown in FIG. 5, after the process of S124, the log management unit 39c executes a connection restoration status value shaping process for executing shaping for converting the character string generated in S124 into a specific connection restoration status value (S125).

Figure 8:
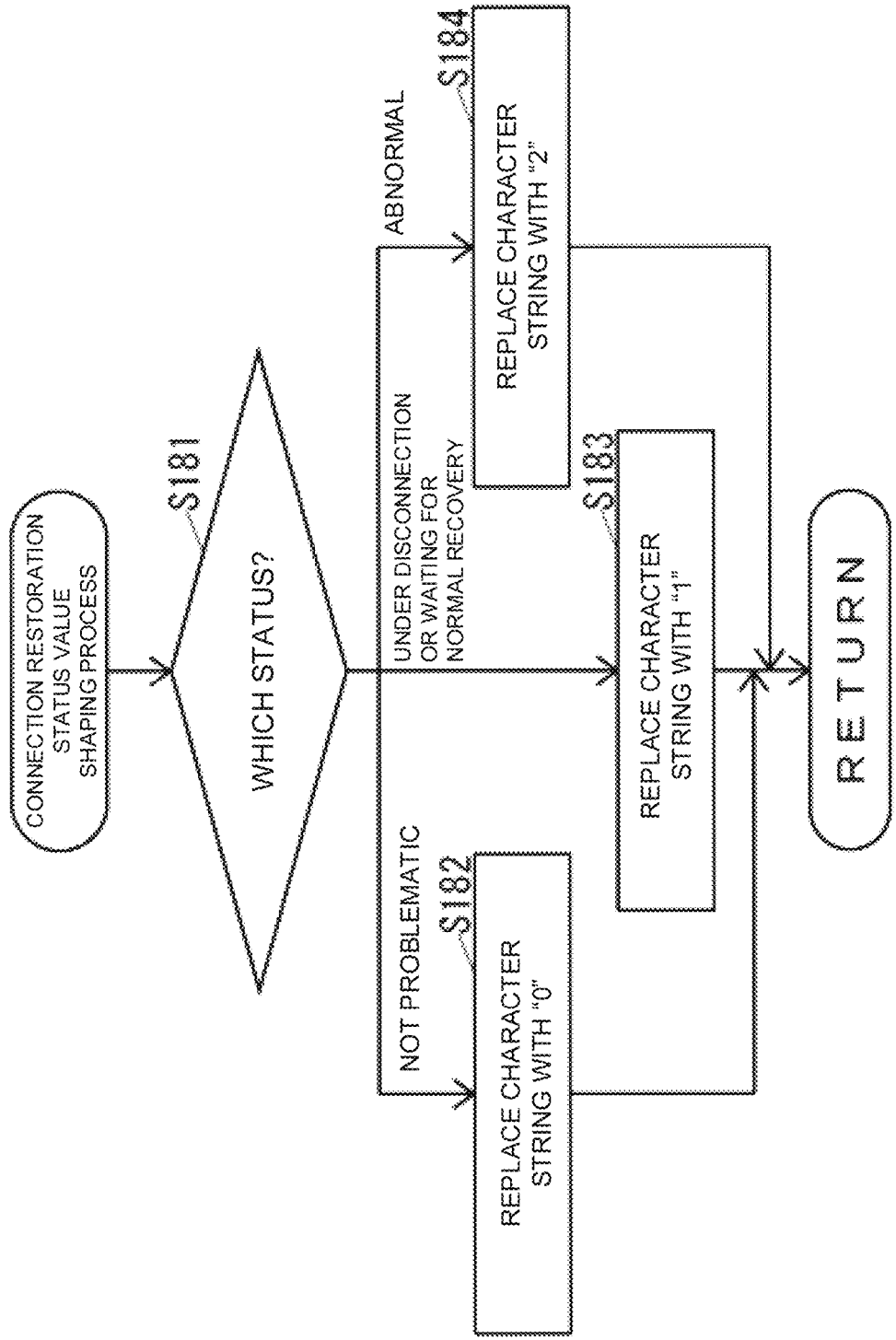
FIG. 8 is a flowchart of a connection restoration status value shaping process shown in FIG. 5.

FIG. 8 is a flowchart of the connection restoration status value shaping process shown in FIG. 5.

As shown in FIG. 8, the log management unit 39c determines the connection status with the MFP 20 and the recovery status of the MFP 20 based on the character string generated in S124 (S181).

The log management unit 39c determines in S181 that the connection status with the MFP 20 and the recovery status of the MFP 20 are not problematic, the log management unit 39c replaces the character string generated in S124 with "0" as the connection restoration status value (S182), and then ends the operation shown in FIG. 8. Here, when the character string generated in S124 does not include the specific disconnection time, that is, when "disconnection time=none", the log management unit 39c determines in S181 that the connection status with the MFP 20 and the recovery status of the MFP 20 are not problematic.

When the log management unit 39c determines in S181 that the connection status with the MFP 20 is a status of disconnection, or when the log management unit 39c determines in S181 that the connection status with the MFP 20 and the recovery status of the MFP 20 are a status waiting for normal recovery, that is, a status that the communication is successful after the disconnection, the recovery signal from the MFP 20 has not been received, but the specific time such as two minutes has not elapsed, the log management unit 39c replaces the character string generated in S124 with "1" as the connection restoration status value (S183), and then ends the operation shown in FIG. 8. Here, when the character string generated in S124 includes the specific disconnection time and does not include the specific success time, that is, when "success time=none", the log management unit 39c determines in S181 that the status of connection with the MFP 20 is the status of disconnection. Also, in the case where the specific disconnection time is included in the character string generated in S124 and the difference between the time of the log itself and the success time is equal to or less than a specific time, the log management unit 39c determines in S181 that the connection status with the MFP 20 and the recovery status of the MFP 20 indicate the status that the communication has succeeded after the disconnection and the recovery signal from the MFP 20 has not been received but the specific time has not elapsed.

When the log management unit 39c determines in S181 that the connection status with the MFP 20 and the recovery status of the MFP 20 are a status of abnormal, that is, a status that the communication has succeeded after the disconnection and a specific time such as two minutes has already elapsed, but the recovery signal from the MFP 20 has not been received, the log management unit 39c replaces the character string generated in S124 with "2" as the connection restoration status value (S184), and then ends the operation shown in FIG. 8. Here, when the character string generated in S124 includes the specific disconnection time, and the difference between the time of the log itself and the success time exceeds the specific time, the log management unit 39c in S181 determines that the connection status with the MFP 20 and the recovery status of the MFP 20 indicates the status that the communication has succeeded after the disconnection, and the specific time has elapsed but the recovery signal from the MFP 20 has not been received.

As shown in FIG. 5, after the process of S125, the log management unit 39c determines whether the character string generated in S125 is the same as the connection restoration status value specified in the previous connection restoration status value specifying process (S126).

When the log management unit 39c determines in S126 that the character string generated in S125 is not the same as the previous connection restoration status value, the log management unit 39c specifies the character string generated in S125 as the connection restoration status value in the current connection restoration status value specifying process (S127), and then ends the operation shown in FIG. 5.

When the log management unit 39c determines in S123 that the type of the target log is not any one of the log indicating the communication error to the MFP 20, the log indicating the successful communication to the MFP 20, and the log indicating the recovery signal from the MFP 20, that is, the other log, or when the log management unit 39c determines in S126 that the character string generated in S125 is the same as the connection restoration status value specified in the previous connection restoration status value specifying process, the log management unit 39c ends the operation shown in FIG. 5 without specifying the connection restoration status value in the current connection restoration status value specifying process.

As shown in FIG. 4, after the process of S101, the log management unit 39c executes an MFP screen specifying process for specifying the screen on the MFP 20 (S102).

Figure 9:
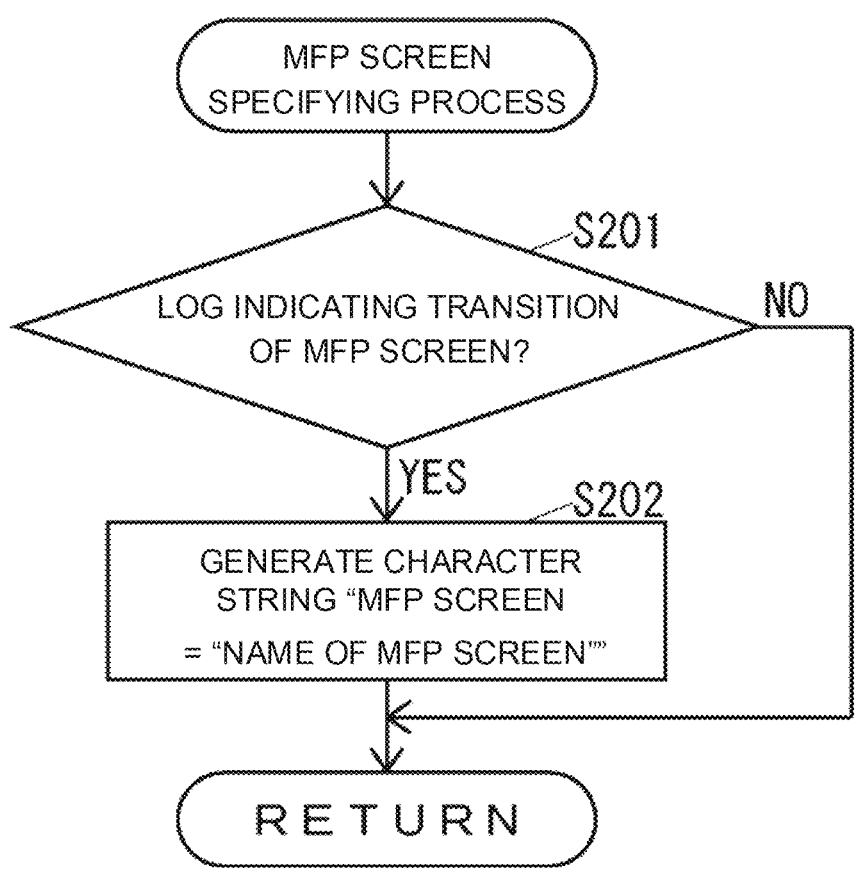
FIG. 9 is a flowchart of the MFP screen specifying process shown in FIG. 4.

FIG. 9 is a flowchart of the MFP screen specifying process shown in FIG. 4.

As shown in FIG. 9, the log management unit 39c determines whether the type of the target log is a log indicating the transition of the screen on the MFP 20 (S201).

When the log management unit 39c determines in S201 that the type of the target log is the log indicating the transition of the screen on the MFP 20, the log management unit 39c generates a character string "MFP screen="name of MFP screed"" (S202). Here, "name of MFP screen" is the name of the screen on MFP 20 included in the target log. For example, the log management unit 39c generates a character string "MFP screen="maintenance screen"" in the process of S202.

When the log management unit 39c determines in S201 that the type of the target log is not the log indicating the transition of the screen on the MFP 20, or completes the process of S202, the log management unit 39c ends the operation shown in FIG. 9.

As shown in FIG. 4, after the process of S102, the log management unit 39c executes an automatic recovery execution status specifying process for specifying the execution status of the process for automatically recovering from the abnormal state (S103).

Figure 10:
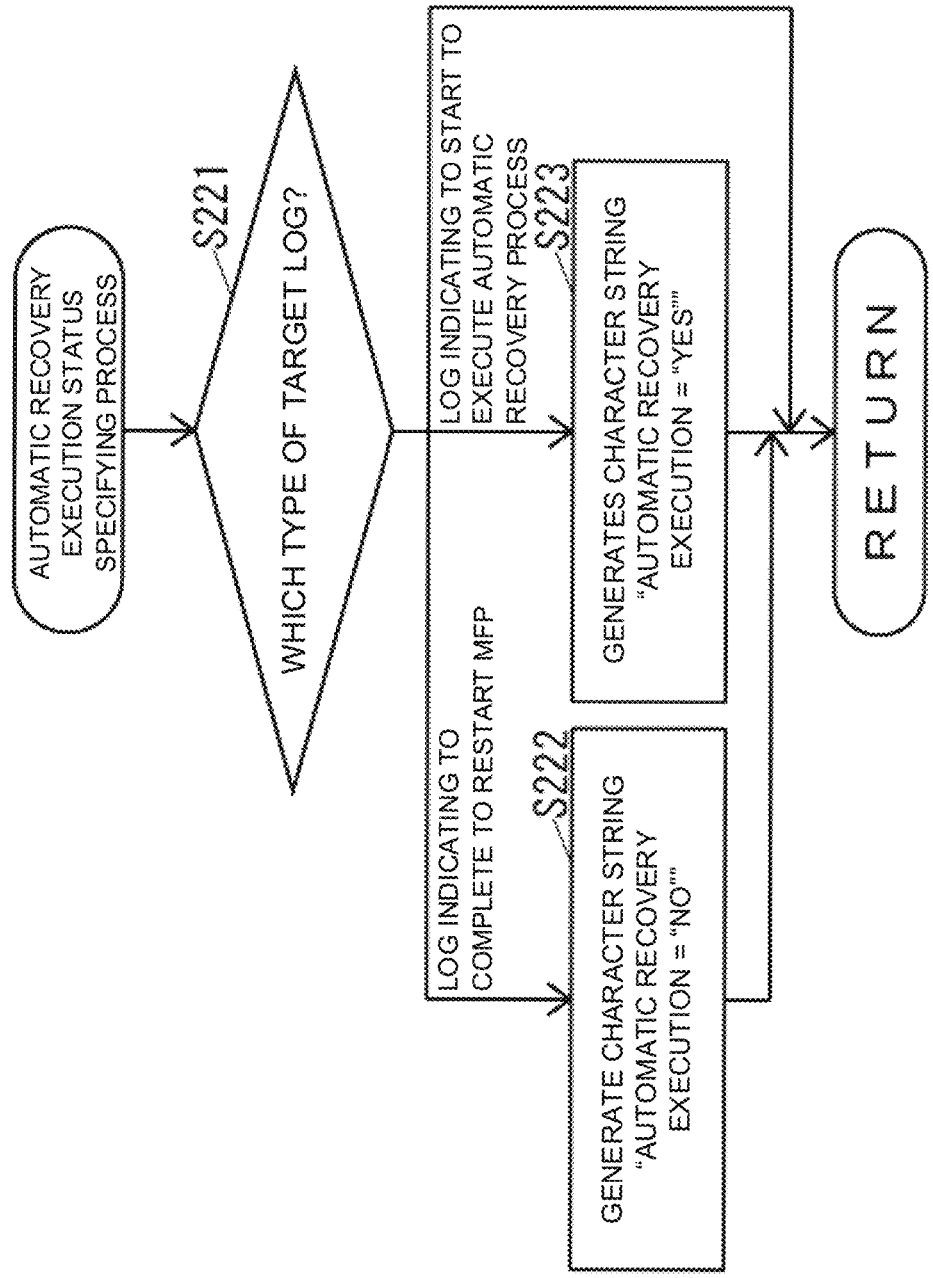
FIG. 10 is a flowchart of an automatic recovery execution status specifying process shown in FIG. 4.

FIG. 10 is a flowchart of the automatic recovery execution status specifying process shown in FIG. 4.

As shown in FIG. 10, the log management unit 39c determines the type of the target log (S221).

When the log management unit 39c determines in S221 that the type of the target log is a log indicating to complete to restart the MFP 20, the log management unit 39c generates a character string "automatic recovery execution="No"" (S222).

When the log management unit 39c determines in S221 that the type of the target log is the log indicating to start to execute the automatic recovery process in the MFP 20, the log management unit 39c generates a character string "automatic recovery execution="Yes"" (S223).

When the log management unit 39c determines that the type of the target log is neither the log indicating to complete to restart the MFP 20 nor the log indicating to start to execute the automatic recovery process in the MFP 20, that is, when the log management unit determines in S221 that the log is the other log, or when the log management unit 39c ends the process of S222 or S223, the log management unit 39c ends the operation shown in FIG. 10.

As shown in FIG. 4, after the process of S103, the log management unit 39c combines the connection restoration status value specified last in the previous connection restoration status value specifying process, the character string generated last in the previous MFP screen specifying process, and the character string generated last in the previous automatic recovery execution status specifying process (S104). For example, when the connection restoration status value specified last in the previous connection restoration status value specifying process is "2", the character string generated last in the previous MFP screen specifying process is "MFP screen="maintenance screen"", and the character string generated last in the previous automatic recovery execution status specifying process is "automatic recovery execution="No"", the log management unit 39c generates a character string (2, MFP screen="maintenance screen", and automatic recovery execution="No") in the process of S104.

After the process of S104, the log management unit 39c executes a restart necessity shaping process for executing shaping for specifying whether to restart the MFP 20 based on the character string generated in S104 (S105).

Figure 11:
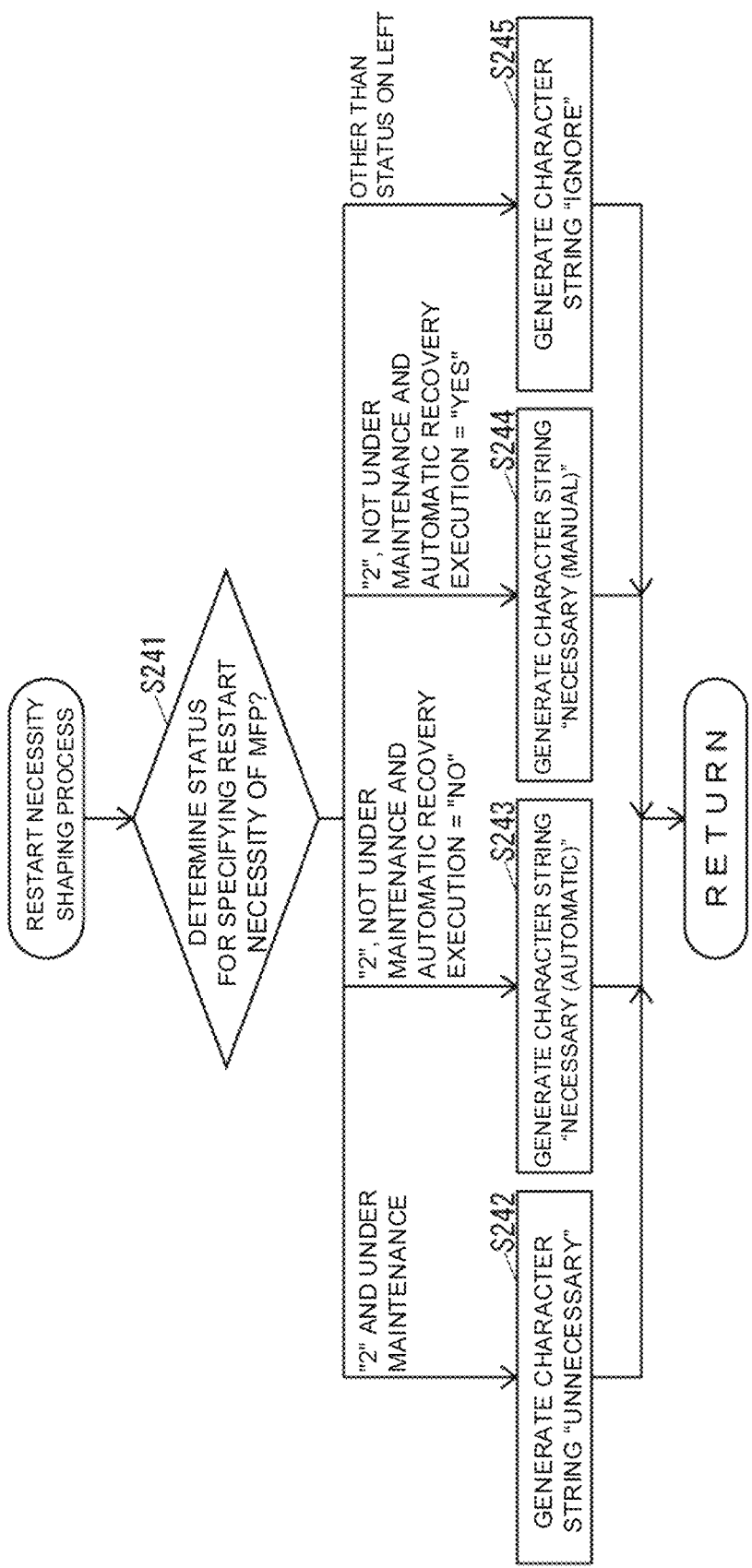
FIG. 11 is a flowchart of a restart necessity shaping process shown in FIG. 4.

FIG. 11 is a flowchart of the restart necessity shaping process shown in FIG. 4.

As shown in FIG. 11, the log management unit 39c determines a status for specifying whether to restart the MFP 20 based on the character string generated in S104 (S241).

When the log management unit 39c determines in S241 that the connection restoration status value is "2" and the MFP 20 is under maintenance, that is, the screen on the MFP 20 is the maintenance screen, the log management unit 39c generates the character string "unnecessary" (S242), and then ends the operation shown in FIG. 11.

When the log management unit 39c determines in S241 that the connection restoration status value is "2", the MFP 20 is not under maintenance, that is, the screen on the MFP 20 is not the maintenance screen, and "automatic recovery execution="No"", the log management unit 39c generates a character string "necessary (automatic)" (S243), and then ends the operation shown in FIG. 11.

When the log management unit 39c determines in S241 that the connection restoration status value is "2", the MFP 20 is not under maintenance, that is, the screen on the MFP 20 is not the maintenance screen, and "automatic recovery execution="Yes"", the log management unit 39c generates a character string "necessary (manual)" (S244), and then ends the operation shown in FIG. 11.

When the log management unit 39c determines in S241 that the status is other than the status described above, the log management unit 39c generates a character string "ignore" (S245), and then ends the operation shown in FIG. 11.

As shown in FIG. 4, after the process of S105, the log management unit 39c determines whether the character string specified in the immediately preceding restart necessity shaping process of the process of S105 is the same as the character string specified in the previous restart necessity shaping process of the immediately preceding restart necessity shaping process (S106).

When the log management unit 39c determines in S106 that the character strings are not the same, the log management unit 39c determines the character string specified in the immediately preceding restart necessity shaping process in S105 (S107).

When the log management unit 39c determines in S107 that the character string specified in the immediately preceding restart necessity shaping process in S105 is "necessary (automatic)", the log management unit 39c adds a schedule for executing the automatic recovery process to the schedule list 38c (S108).

When the log management unit 39c determines in S107 that the character string specified in the immediately preceding restart necessity shaping process in S105 is "necessary (manual)", the log management unit 39c adds a schedule for guiding the manual recovery operation to the schedule list 38c (S109).

When the log management unit 39c determines in S107 that the character string specified in the immediately preceding restart necessity shaping process in S105 is "No", the log management unit 39c deletes the schedule for executing the automatic recovery process or the schedule for guiding the manual recovery operation from the schedule list 38c (S110).

When the log management unit 39c determines in S106 that the character strings are the same, the management unit determines in S107 that the character string specified in the immediately preceding restart necessity shaping process is "ignore" in S105, or the management unit executes the process of S108, S109 or S110, the log management unit 39c ends the operation shown in FIG. 4.

Next, the operation of the image forming system 10 in the case where an abnormality occurs will be described.

Figure 12:
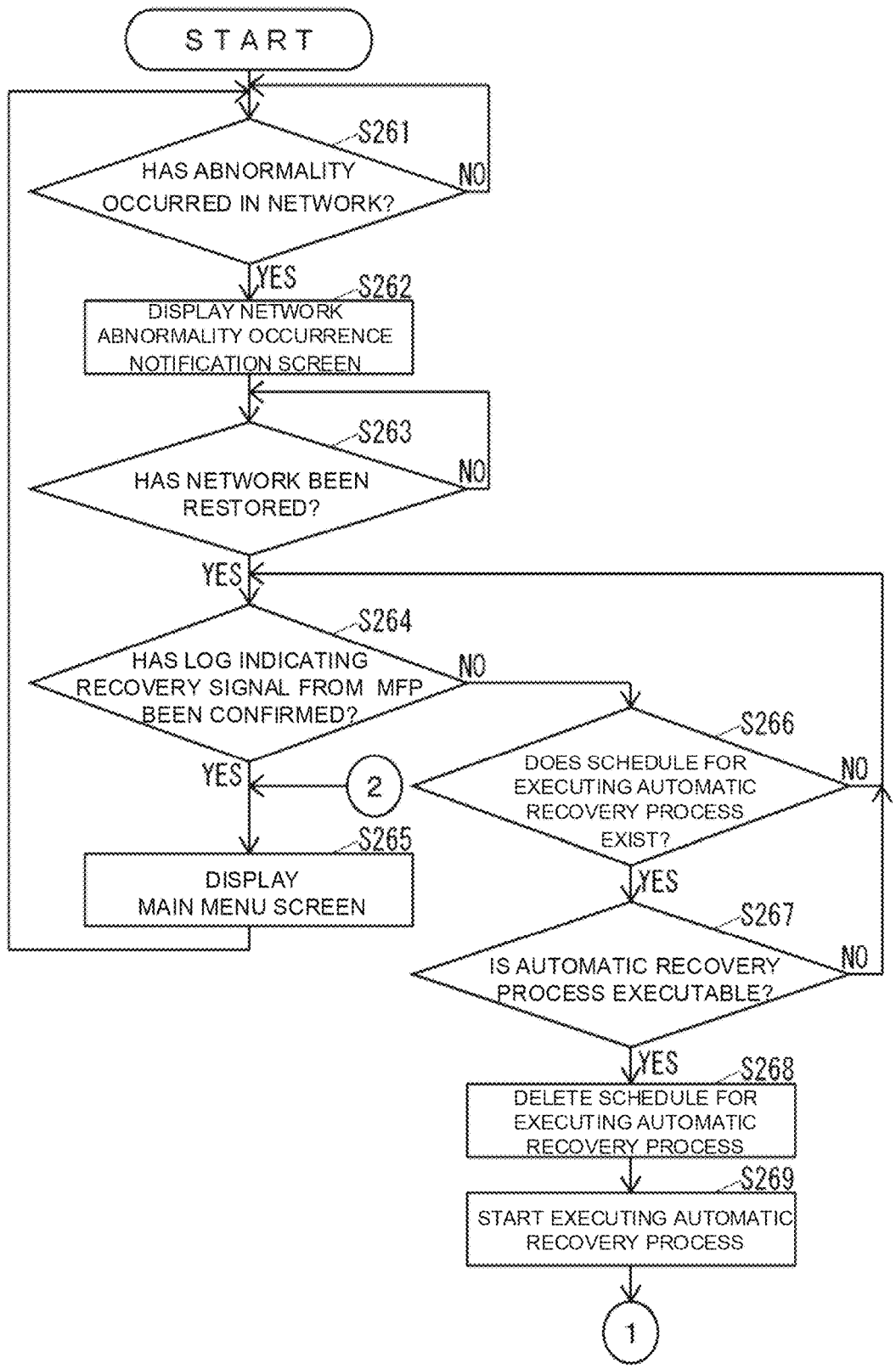
FIG. 12 is a flowchart of a part of the operation of the image forming system shown in FIG. 1 in the case where an abnormality occurs.
Figure 13:
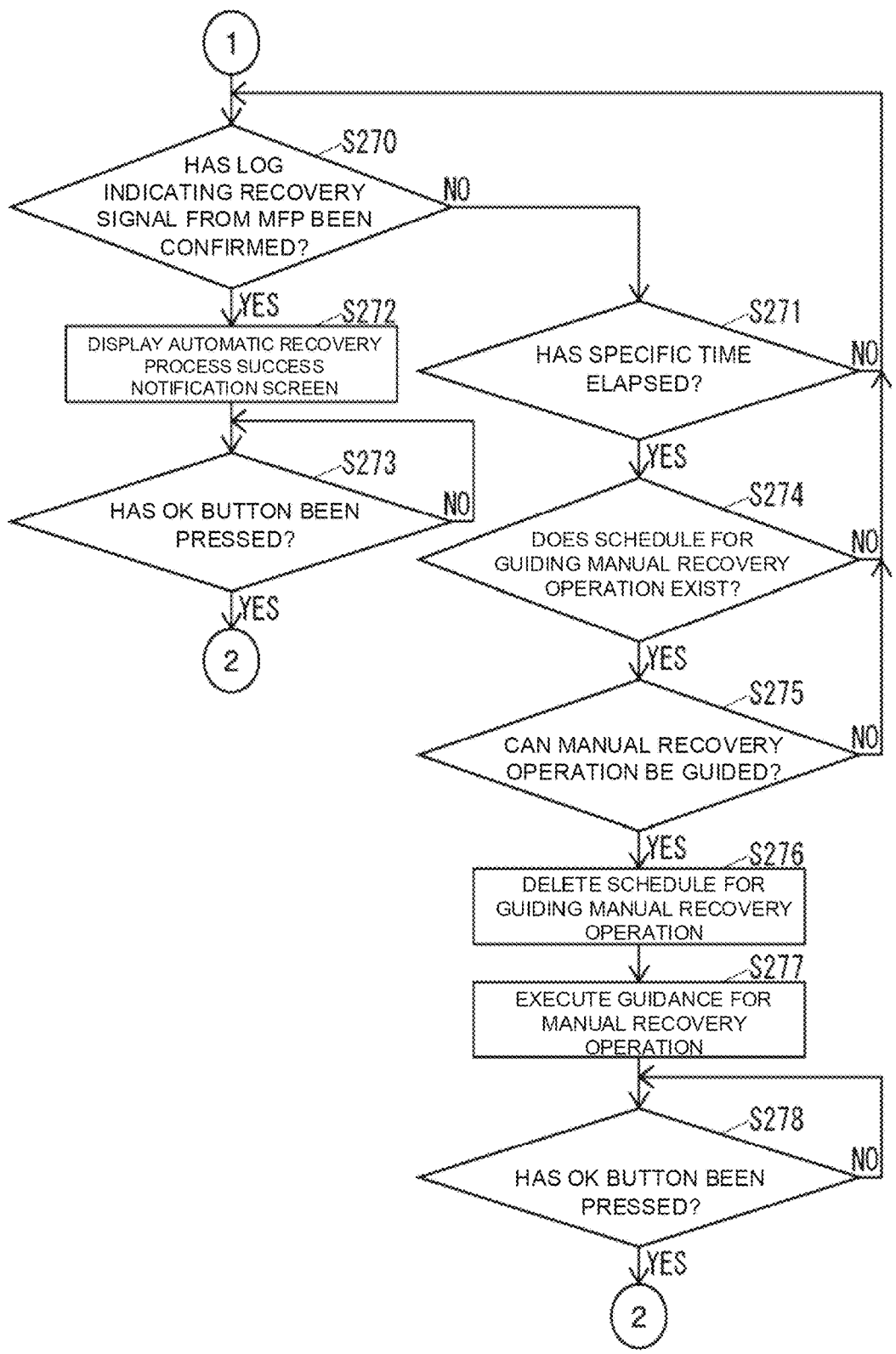
FIG. 13 is a flowchart following the flowchart shown in FIG. 12.

FIGS. 12 and 13 are flowcharts of the operation of the image forming system 10 in the case where an abnormality occurs.

As shown in FIGS. 12 and 13, the log management unit 39c determines whether an abnormality has occurred in the network with the MFP 20 based on the device log 38a and the service log 38b (S261). Here, when the log management unit 39c determines that the communication error to the MFP 20 has occurred based on the device log 38a and the service log 38b, the log management unit 39c determines that an abnormality has occurred in the network with the MFP 20. Further, when the log management unit 39c determines that the communication error to the MFP 20 has not occurred based on the device log 38a and the service log 38b, the log management unit 39c determines that no abnormality has occurred in the network with the MFP 20.

When the log management unit 39c determines in S261 that no abnormality has occurred in the network with the MFP 20, the log management unit 39c repeats executing the process of S261.

Figure 14:
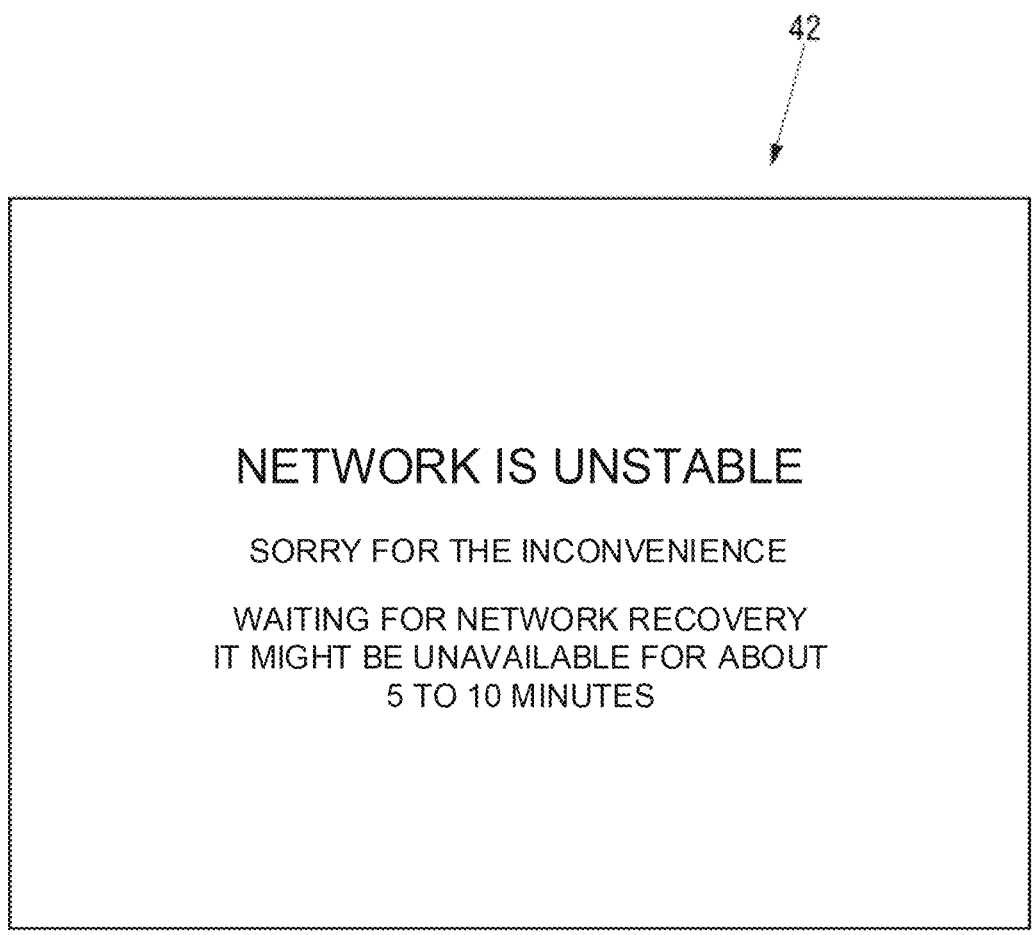
FIG. 14 is a diagram showing an example of a network abnormality occurrence notification screen displayed in the operation shown in FIGS. 12 and 13.

When the log management unit 39c determines in S261 that the abnormality has occurred in the network with the MFP 20, the log management unit 39c displays, on the touch panel 31a, a network abnormality occurrence notification screen 42 (see FIG. 14) indicating that the abnormality has occurred in the network with the MFP 20 (S262).

Then, the log management unit 39c determines whether the network with the MFP 20 has been restored based on the device log 38a and the service log 38b (S263). Here, when the log management unit 39c determines that the communication to the MFP 20 has succeeded based on the device log 38a and the service log 38b, the log management unit 39c determines that the network with MFP 20 has been restored. When the log management unit 39c determines that the communication to the MFP 20 has not succeeded based on the device log 38a and the service log 38b, the log management unit 39c determines that the network with the MFP 20 has not been restored.

When the log management unit 39c determines in S263 that the network with the MFP 20 has not been restored, the log management unit 39c repeats executing the process of S263.

When the log management unit 39c determines in S263 that the network with the MFP 20 has been restored, the log management unit 39c determines whether the log indicating the recovery signal from the MFP 20 has been confirmed (S264).

When the log management unit 39c determines in S264 that the log indicating the recovery signal from the MFP 20 has been confirmed, the log management unit 39c displays the main menu screen 41 (see FIG. 1) on the touch panel 31a(S265), returns to S261, and executes the process of S261.

When the log management unit 39c determines in S264 that the log indicating the recovery signal from the MFP 20 has not been confirmed, the log management unit 39c determines whether the schedule for executing the automatic recovery process exists in the schedule list 38c (S266). Here, when the communication has succeeded after the disconnection with the MFP 20 and the specific time has already elapsed, but the recovery signal from the MFP 20 has not been received ("abnormal" in S181), the log management unit 39c adds the schedule for executing the automatic recovery process to the schedule list 38c (S108), after completing to restart the MFP 20, before starting to execute the automatic recovery process (S221 to S223).

When the log management unit 39c determines in S266 that the schedule for executing the automatic recovery process does not exist in the schedule list 38c, the log management unit 39c executes the process of S264.

When the log management unit 39c determines in S266 that the schedule for executing the automatic recovery process exists in the schedule list 38c, the log management unit 39c determines whether the automatic recovery process is executable (S267). For example, the status where the user is executing an operation for the "copy" service on the image forming system 10 is not the status where the automatic recovery process is executable. The status where the main menu screen 41 is displayed on the touch panel 31a is the status where the automatic recovery process is executable.

When the log management unit 39c determines in S267 that the automatic recovery process is not executable, the log management unit 39c executes the process of S264.

Figure 15:
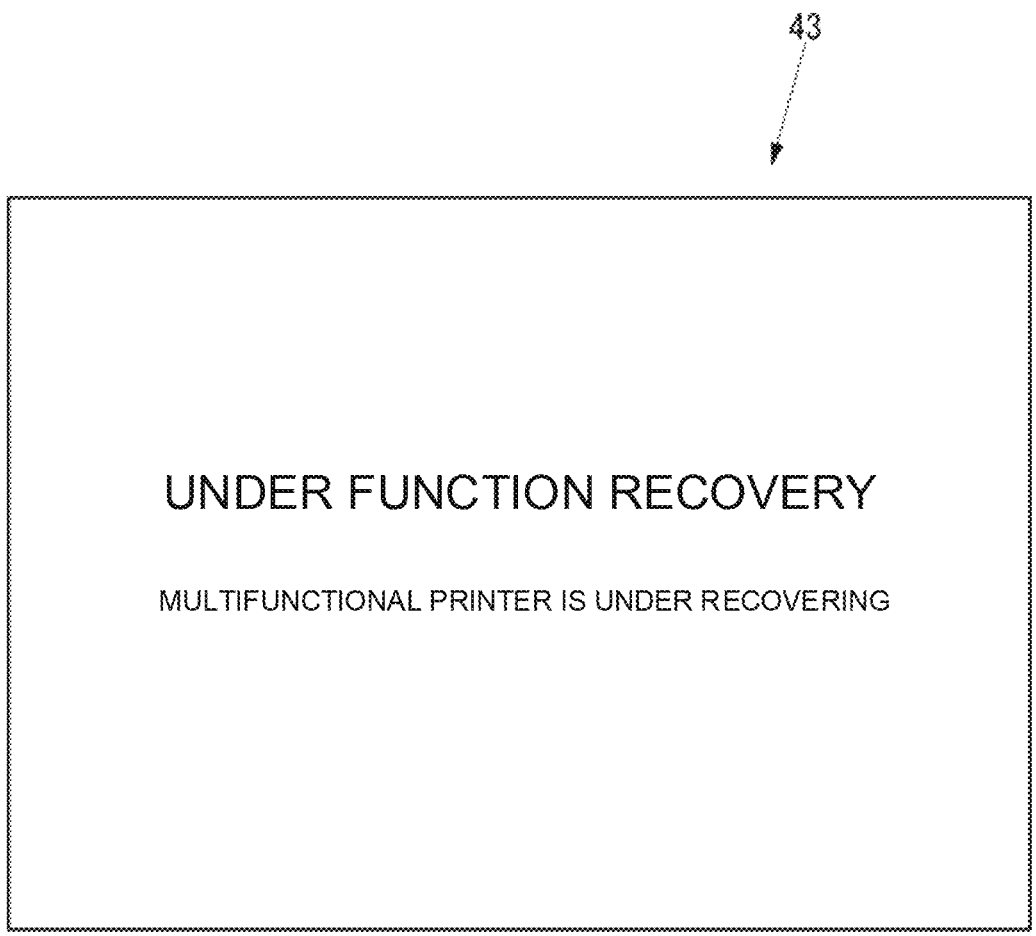
FIG. 15 is a diagram showing an example of an automatic recovery process execution notification screen displayed in the operation shown in FIGS. 12 and 13.

When the log management unit 39c determines in S267 that the automatic recovery process is executable, the log management unit 39c deletes the schedule for executing the automatic recovery process from the schedule list 38c (S268), and starts executing the automatic recovery process (S269). That is, the log management unit 39c instructs the MFP 20 to restart, and displays, on the touch panel 31a, an automatic recovery process execution notification screen 43 indicating that the automatic recovery process is being executed (see FIG. 15).

After the process of S269, the log management unit 39c determines whether the log indicating the recovery signal from the MFP 20 has been confirmed (S270).

When the log management unit 39c determines in S270 that the log indicating the recovery signal from the MFP 20 has not been confirmed, the log management unit 39c determines whether a specific time has elapsed since the process of S269 is executed (S271).

When the log management unit 39c determines in S271 that the specific time has not elapsed since the process of S269 is executed, the log management unit 39c returns to S270 and executes the process of S270.

Figure 16:
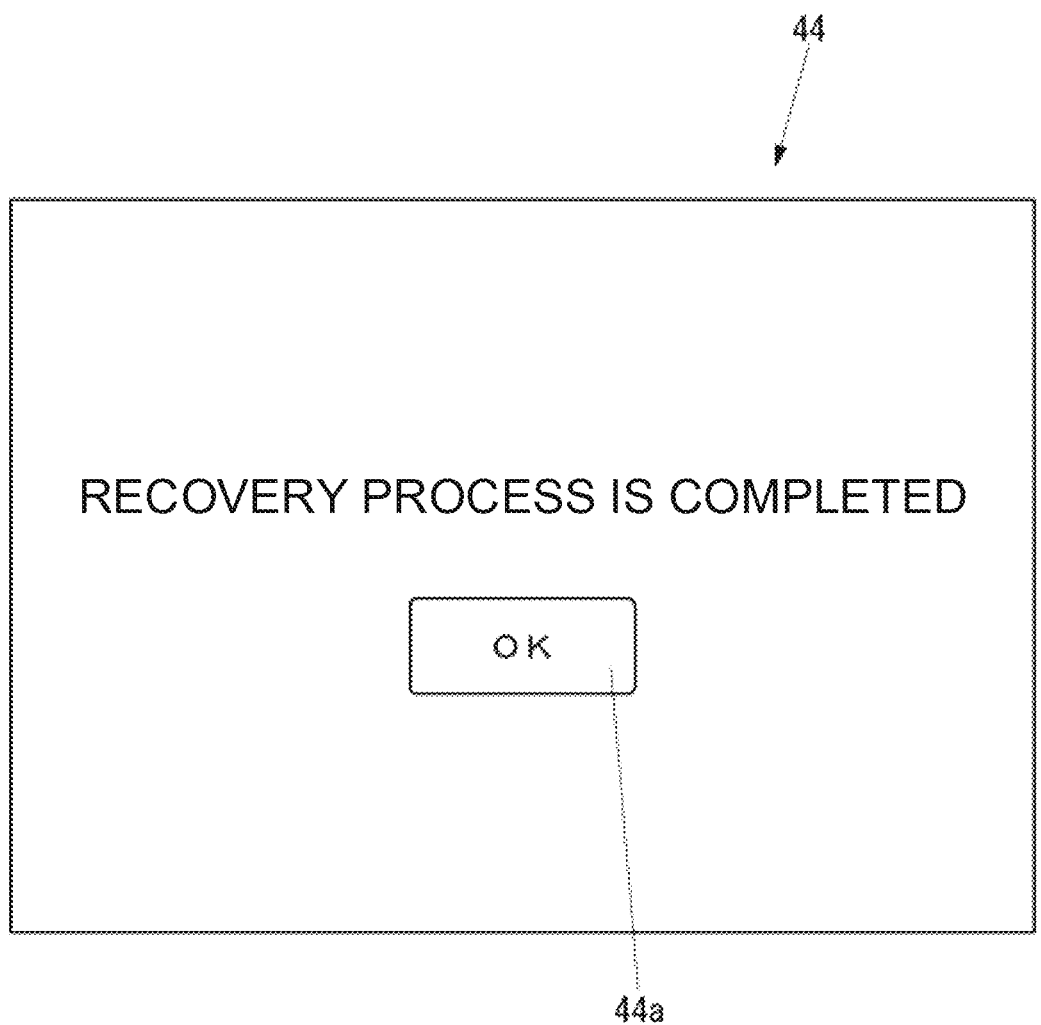
FIG. 16 is a diagram showing an example of an automatic recovery process success notification screen displayed in the operation shown in FIGS. 12 and 13.

When the log management unit 39c determines in S270 that the log indicating the recovery signal from the MFP 20 has been confirmed, the log management unit 39c displays, on the touch panel 31a, an automatic recovery process success notification screen 44 (see FIG. 16) indicating that the automatic recovery process has succeeded (S272), and determines whether the OK button 44a has been pressed on the automatic recovery process success notification screen 44 until the log management unit 39c determines that the OK button 44a (see FIG. 16) has been pressed on the automatic recovery process success notification screen 44 (S273).

When the log management unit 39c determines in S273 that the OK button 44a has been pressed on the automatic recovery process success notification screen 44, the log management unit 39c executes the process of S265.

When the log management unit 39c determines in S271 that the specific time has elapsed since the process of S269 is executed, the log management unit 39c determines whether the schedule for guiding the manual recovery operation exists in the schedule list 38c (S274). Here, when the communication has succeeded after the disconnection with the MFP 20 and the specific time has already elapsed, but the recovery signal from the MFP 20 has not been received ("abnormal" in S181), the log management unit 39c adds the schedule for guiding the manual recovery operation to the schedule list 38c (S109), after starting to execute the automatic recovery process and before completing to restart the MFP 20 (S221 to S223).

When the log management unit 39c determines in S274 that the schedule for guiding the manual recovery operation does not exist in the schedule list 38c, the log management unit 39c executes the process of S270.

When the log management unit 39c determines in S274 that the schedule for guiding the manual recovery operation exists in the schedule list 38c, the log management unit 39c determines whether the manual recovery operation can be guided (S275).

When the log management unit 39c determines in S275 that the manual recovery operation cannot be guided, the log management unit 39c executes the process of S270.

Figure 17:
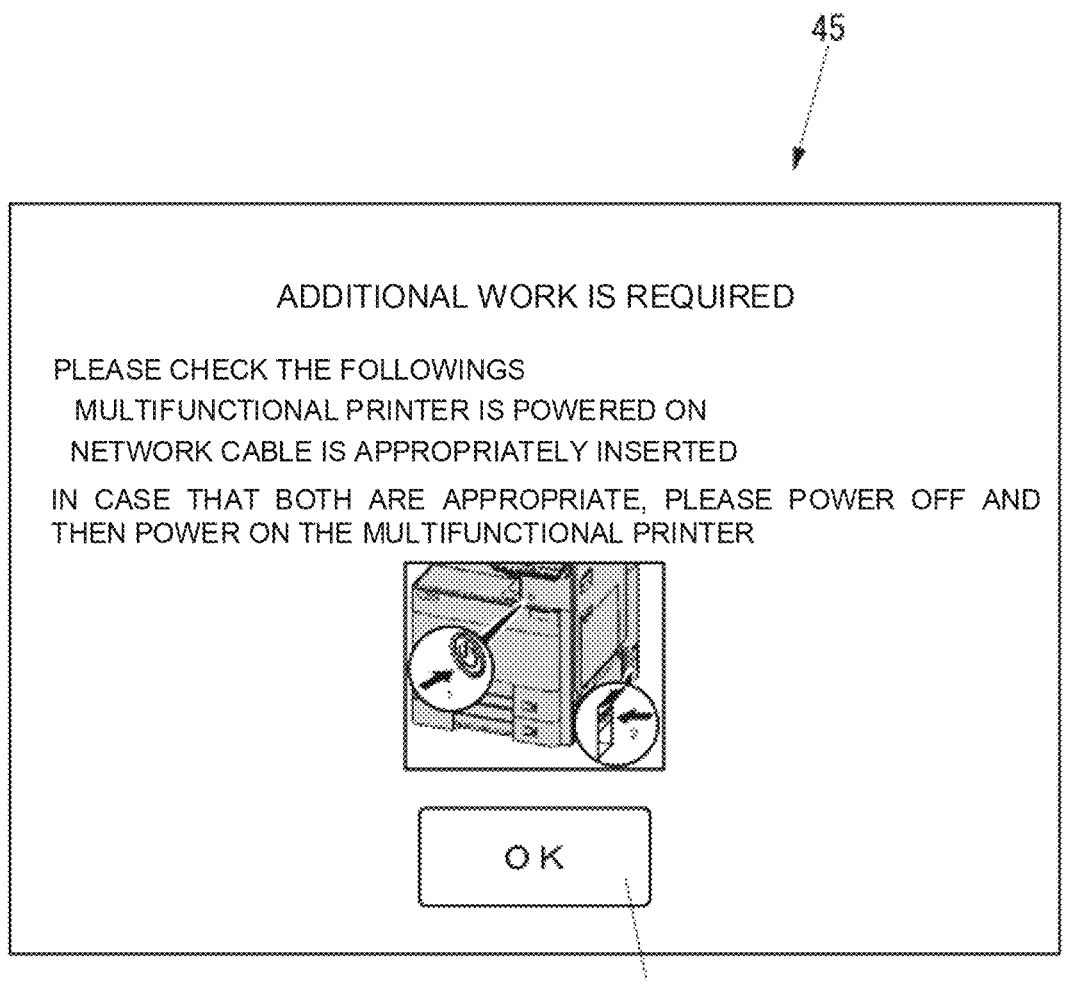
FIG. 17 is a diagram showing an example of a manual recovery operation guide screen displayed in the operation shown in FIGS. 12 and 13.

When the log management unit 39c determines in S275 that the manual recovery operation can be guided, the log management unit 39c deletes the schedule for guiding the manual recovery operation from the schedule list 38c (S276), and executes the guidance for the manual recovery operation (S277). That is, the log management unit 39c displays, on the touch panel 31a, a manual recovery operation guide screen 45 (see FIG. 17) for guiding the manual recovery operation.

The log management unit 39c determines whether the OK button 45a (see FIG. 17) has been pressed on the manual recovery operation guide screen 45 until the log management unit 39c determines that the OK button 45a has been pressed on the manual recovery operation guide screen 45, after the process of S277 (S278).

When the log management unit 39c determines in S278 that the OK button 45a has been pressed on the manual recovery operation guide screen 45, the log management unit 39c executes the process of S265.

As explained above, the kiosk terminal 30 detects the abnormality that has elapsed the specific time after the successful communication with the MFP 20 but has not received the recovery signal from the MFP 20, based on the log indicating the communication success to the MFP 20 and the log indicating the recovery signal from the MFP 20 (S101). Therefore, the image forming system 10 according to the present embodiment can achieve a technical effect that allows it to detect a complicated abnormality that occurs according to the series of flows. Note that the image forming system 10 may detect an abnormality other than the abnormality that has elapsed the specific time after the successful communication with the MFP 20 but has not received the recovery signal from the MFP 20 based on a plurality of logs.

The image forming system 10 executes the automatic recovery process for automatically recovering the abnormality (S269). Therefore, the image forming system 10 can reduce the trouble of the user to cope with and quickly recover from the abnormality.

When the abnormality has not been recovered by executing the automatic recovery process (NO in S270), the image forming system 10 guides the manual operation for recovering from the abnormality (S277). Therefore, the image forming system 10 can improve the possibility to enable to reduce the trouble of the user for responding to the abnormality, compared to the configuration that guides the manual operation for recovering from the abnormality without executing the automatic recovery process. It should be noted that the image forming system 10 may be configured to guide the manual operation for recovering from the abnormality without executing the automatic recovery process.

The image forming system 10 does not execute the automatic recovery process or guide the manual operation for recovering from the abnormality when the MFP 20 is maintained (S108 to S110 and S241 to S244). Therefore, the image forming system 10 can improve convenience.

In the present embodiment, the image forming system 10 detects the abnormality occurring in the image forming system 10 by the kiosk terminal 30. However, the image forming system 10 may detect the abnormality occurring in the image forming system 10 by the MFP 20 or by both the MFP 20 and the kiosk terminal 30. For example, when the image forming system 10 detects the abnormality occurring in the image forming system 10 by both the MFP 20 and the kiosk terminal 30, the image forming system 10 may detect the abnormality occurring in the MFP 20 by the MFP 20 itself, and may detect the abnormality occurring in the kiosk terminal 30 by the kiosk terminal 30 itself.

The image forming apparatus according to the present disclosure is the MFP in the present embodiment. However, the image forming apparatus according to the present disclosure may be an image forming apparatus other than the MFP, such as a dedicated printer, a dedicated copy machine, a dedicated facsimile machine, or a dedicated scanner.

Next, a second embodiment of the present disclosure will be described with reference to the drawings. According to the first embodiment, the configuration of the image forming system of the present disclosure that detects the complicated abnormality that occurs according to the series of flows has been described, using the example of detecting the abnormality that has elapsed the specific time after the successful communication to the image forming apparatus but has not received the recovery signal from the image forming apparatus. In the second embodiment, a configuration of the image forming system of the present disclosure that detects the complicated abnormality that occurs according to the series of flows will be described using an example of detecting a freeze abnormality of a screen displayed on the touch panel. The image forming system according to the second embodiment can also achieve the technical effect that detects the complicated abnormality that occurs according to the series of flows.

The configuration of the image forming system according to the second embodiment is the same as that of the first embodiment (FIGS. 1 to 3). Therefore, the description in the second embodiment is omitted unless particularly necessary, and the same reference numerals as those in the first embodiment are used for the elements of the image forming system.

Hereinafter, the operation of the image forming system 10 according to the second embodiment will be described.

It might be happened that the image forming system 10 cannot be used because the screen displayed on the touch panel 31a freezes. When the screen displayed on the touch panel 31a freezes, the user generally touches the screen many times to check the reaction. The image forming system 10 can detect that the screen displayed on the touch panel 31a freezes as an abnormality of the image forming system 10 by detecting the abnormal operation.

The kiosk terminal 30 can execute a process for recovering from the freeze abnormality of the screen displayed on the touch panel 31a. The freeze of the screen displayed on the touch panel 31a may be caused by the excessive use of the RAM in the controller 39. Therefore, the process for recovering from the freeze abnormality of the screen displayed on the touch panel 31a includes the recovery of the RAM in the controller 39. Further, the freeze of the screen displayed on the touch panel 31a may be caused by the fact that no response is returned from the outside of the kiosk terminal 30 due to a communication failure via the communication unit 37. Therefore, the process for recovering from the freeze abnormality of the screen displayed on the touch panel 31a includes the forced termination of the communication via the communication unit 37. Further, the freeze of the screen displayed on the touch panel 31a may be caused by a program defect. Therefore, the process for recovering from the freeze abnormality of the screen displayed on the touch panel 31a includes the forced termination of the service.

First, the operation of the kiosk terminal 30 when adding a schedule for executing the recovery process to the schedule list 38c or deleting the schedule from the schedule list 38c will be described.

Figure 18:
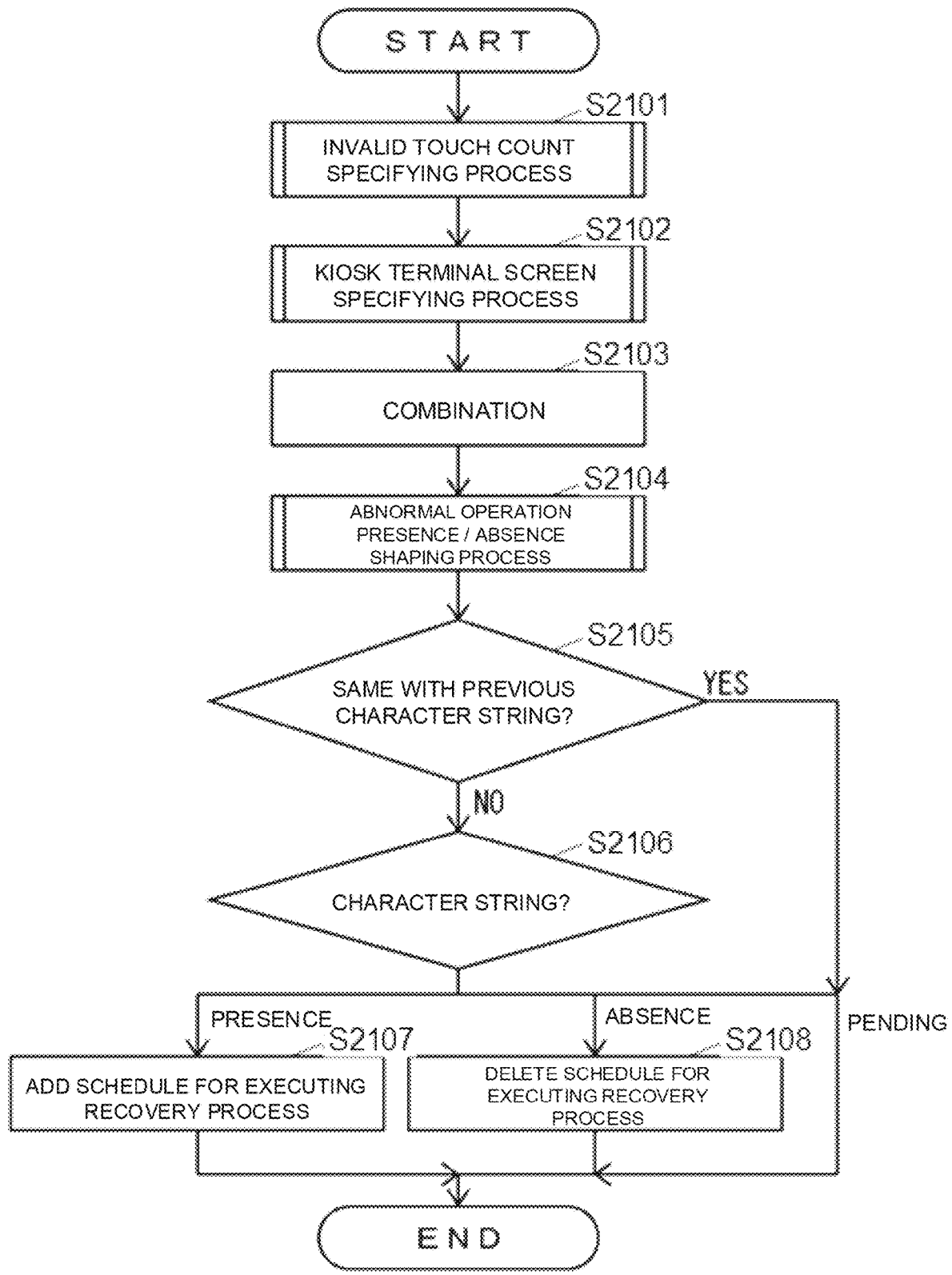
FIG. 18 is a flowchart of the operation of the kiosk terminal shown in FIG. 3 in the case of adding a schedule for executing a recovery process to the schedule list, or deleting the schedule from the schedule list according to a second embodiment of the disclosure.

FIG. 18 is the flowchart of the operation of the kiosk terminal 30 when adding a schedule for executing the recovery process to the schedule list 38c or deleting the schedule from the schedule list 38c.

Every time one log is added to at least one of the device log 38a and the service log 38b, the log management unit 39c executes the operation shown in FIG. 18 with respect to the increased log.

As shown in FIG. 18, the log management unit 39c executes an invalid touch count specifying process for specifying the count of invalid touches on the touch panel 31a (hereinafter, referred to as "invalid touch count") (S2101).

Note that the invalid touch on the touch panel 31a is a touch that does not cause the image forming system 10 to start a specific operation such as a change in copy setting or a start of copy. On the other hand, an effective touch on the touch panel 31a is a touch that causes the image forming system 10 to start the specific operation. Therefore, a log indicating a touch that has caused to start the specific operation is a log indicating the valid touch, and a log indicating a touch that has not caused to start the specific operation is a log indicating the invalid touch.

Figure 19:
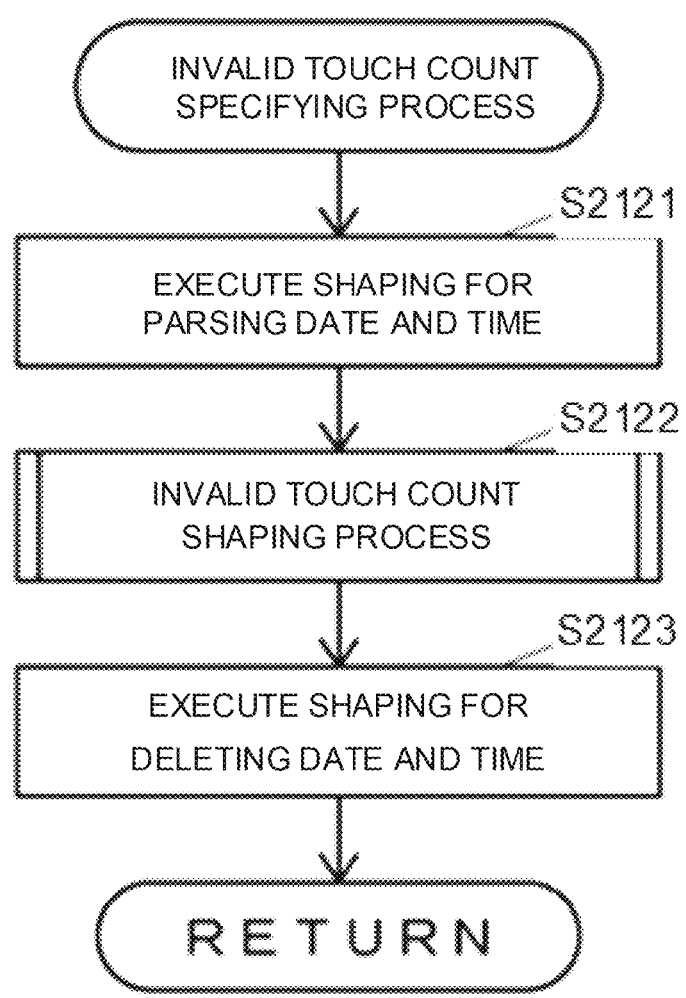
FIG. 19 is a flowchart of an invalid touch count specifying process shown in FIG. 18.

FIG. 19 is a flowchart of the invalid touch count specifying process shown in FIG. 18.

As shown in FIG. 19, the log management unit 39c executes shaping for parsing the date and time on the character string obtained by copying the target log (S2121). For example, when the target log is a character string "2018/1/1 00:50:20 . . . , the log management unit 39c generates a character string (2018/1/1 00:50:20, " . . . ") by the process of S2121. Note that the specific content in the log is described in " . . . ".

After the process of S2121, the log management unit 39c executes an invalid touch count shaping process of executing shaping on the character string generated in S2121 to replace the specific content of the log with the invalid touch count (S2122).

Figure 20:
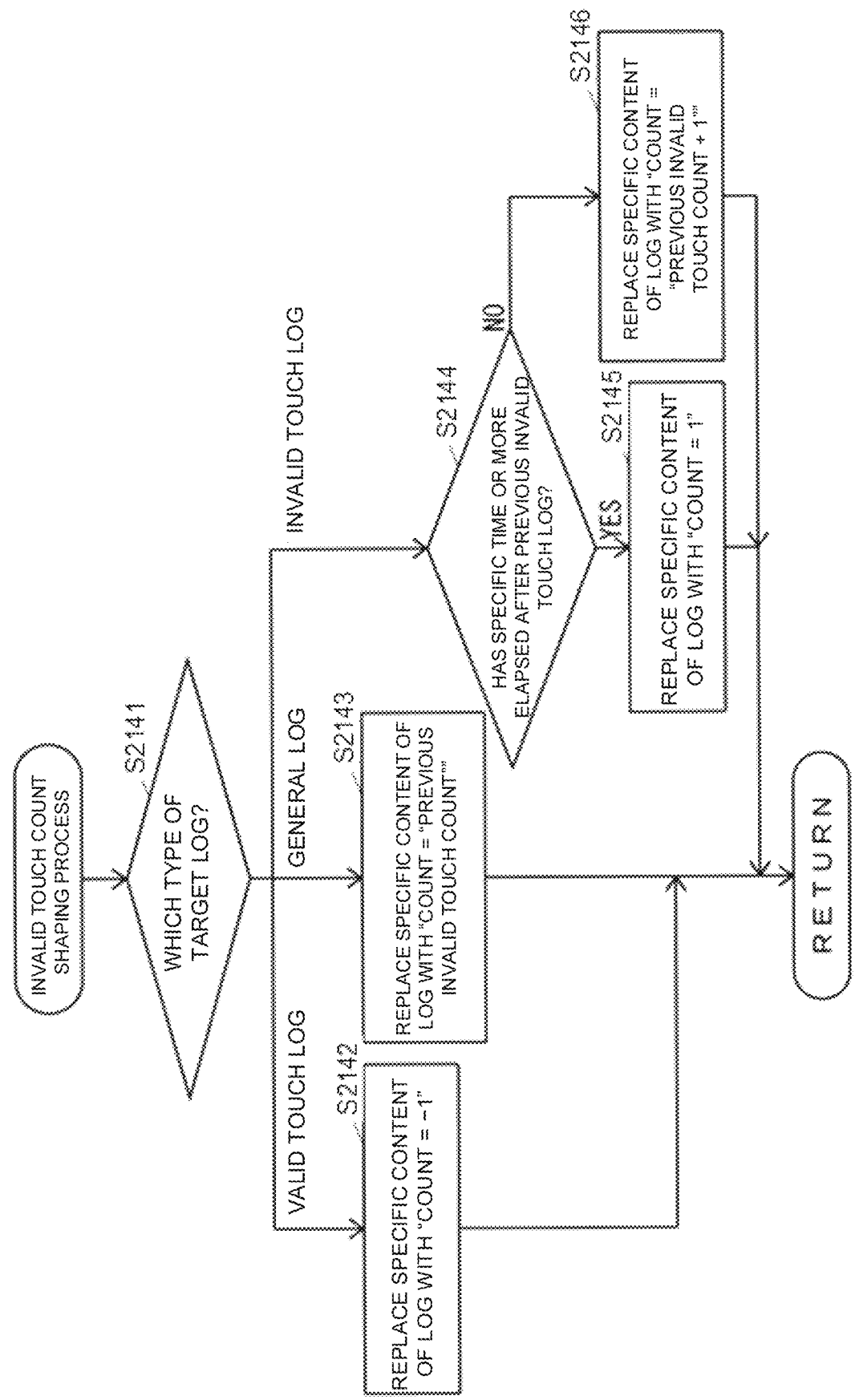
FIG. 20 is a flowchart of an invalid touch count shaping process shown in FIG. 19.

FIG. 20 is a flowchart of the invalid touch count shaping process shown in FIG. 19.

As shown in FIG. 20, the log management unit 39c determines the type of the target log based on the specific content of the log described in the target log (S2141).

When the log management unit 39c determines in S2141 that the type of the target log is the valid touch log on the touch panel 31a, the log management unit 39c replaces the specific content of the log with "count=−1" for the character string generated in S2121 (S2142), and then ends the operation shown in FIG. 20.

When the log management unit 39c determines in S2141 that the type of the target log is not the touch log on the touch panel 31*a*, that is, the type of the target log is a general log, the log management unit 39*c* replaces the specific content of the log with "count="previous invalid touch count"" for the character string generated in S2121 (S2143), and then ends the operation shown in FIG. 20. Here, the "previous invalid touch count" is actually a specific invalid touch count included in the character string generated in the previous invalid touch count shaping process.

When the log management unit 39*c* determines in S2141 that the type of the target log is the invalid touch log on the touch panel 31*a*, the log management unit 39*c* determines whether a specific time such as 30 seconds has elapsed after the previous invalid touch log (S2144).

When the log management unit 39*c* determines in S2144 that the specific time or more has elapsed after the previous invalid touch log, the log management unit 39*c* replaces the specific content of the log with "count=1" for the character string generated in S2121 (S2145), and then ends the operation shown in FIG. 20.

When the log management unit 39*c* determines in S2144 that the specific time has not elapsed after the previous invalid touch log, the log management unit 39*c* replaces the specific content of the log with "count="previous invalid touch count+1"" for the character string generated in S2121 (S2146), and then ends the operation shown in FIG. 20. Here, "previous invalid touch count+1" is actually a value obtained by adding 1 (one) to the specific invalid touch count included in the character string generated in the previous invalid touch count shaping process.

For example, in case that the character string generated in S2121 is (2018/1/1 00:50:20, " . . . "), when the type of the target log is the invalid touch log on the touch panel 31*a*("invalid touch log" in S2141), the specific time has not elapsed after the previous invalid touch log (NO in S2144), and the character string generated in the previous invalid touch count shaping process is (2018/1/1 00:50:20, count=5), the log management unit 39*c* generates a character string (2018/1/1 00:50:20, count=6) in the process of S2146.

As shown in FIG. 19, after the process of S2122, the log management unit 39*c* executes shaping for deleting the date and time from the character string generated in S2122 (S2123). For example, when the character string generated in S2122 is (2018/1/1 00:50:20, count=6), the log management unit 39*c* generates a character string "count=6" in the process of S2123.

After the process of S2123, the log management unit 39*c* ends the operation shown in FIG. 19.

As shown in FIG. 19, after the process of S2101, the log management unit 39*c* executes a kiosk terminal screen specifying process for specifying the screen on the kiosk terminal 30, that is, the screen displayed on the touch panel 31*a*(S2102).

Figure 21:
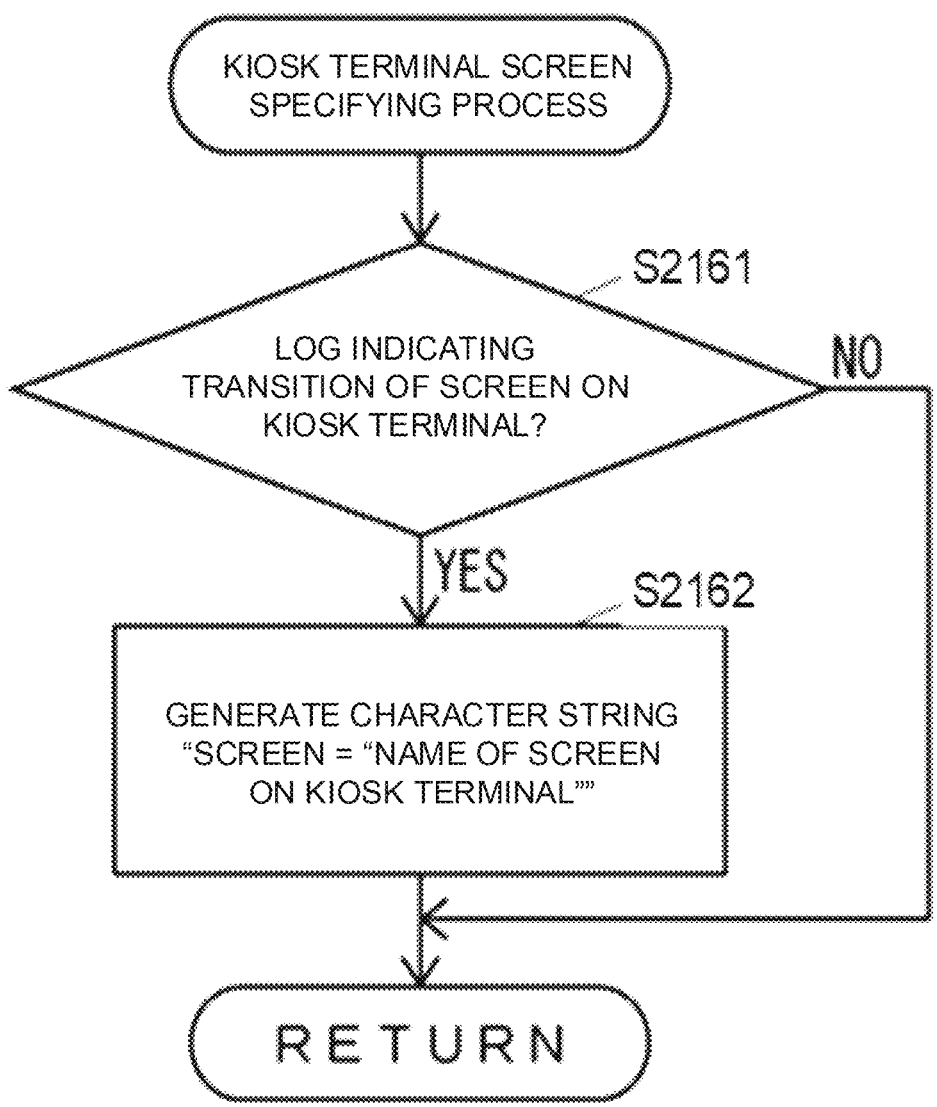
FIG. 21 is a flowchart of a kiosk terminal screen specifying process shown in FIG. 18.

FIG. 21 is a flowchart of the kiosk terminal screen specifying process shown in FIG. 18.

As shown in FIG. 21, the log management unit 39*c* determines whether the type of the target log is a log indicating the transition of the screen on the kiosk terminal 30 (S2161).

When the log management unit 39*c* determines in S2161 that the type of the target log is the log indicating the transition of the screen on the kiosk terminal 30, the log management unit 39*c* generates a character string "screen="name of screen on kiosk terminal"" (S2162). Here, "name of screen on kiosk terminal" is the name of the screen on the kiosk terminal 30 included in the target log.

For example, the log management unit 39*c* generates a character string "screen="setting screed"" in the process of S2162.

When the log management unit 39*c* determines in S2161 that the type of the target log is not the log indicating the transition of the screen on the kiosk terminal 30, or when the process of S2162 is completed, the log management unit 39*c* ends the operation shown in FIG. 21.

As shown in FIG. 18, after the process of S2102, the log management unit 39*c* combines the invalid touch count specified last in the previous invalid touch count specifying process with the character string generated last in the previous kiosk terminal screen specifying process (S2103). For example, the invalid touch count specified last in the previous invalid touch count specifying process is "count=6", and the character string generated last in the previous kiosk terminal screen specifying process is "screen="setting screen"", the log management unit 39*c* generates a character string (count=6, screen="setting screen") in the process of S2103.

After the process of S2103, the log management unit 39*c* executes an abnormal operation presence/absence shaping process for executing shaping for specifying the presence or absence of an abnormal operation based on the character string generated in S2103 (S2104).

Figure 22:
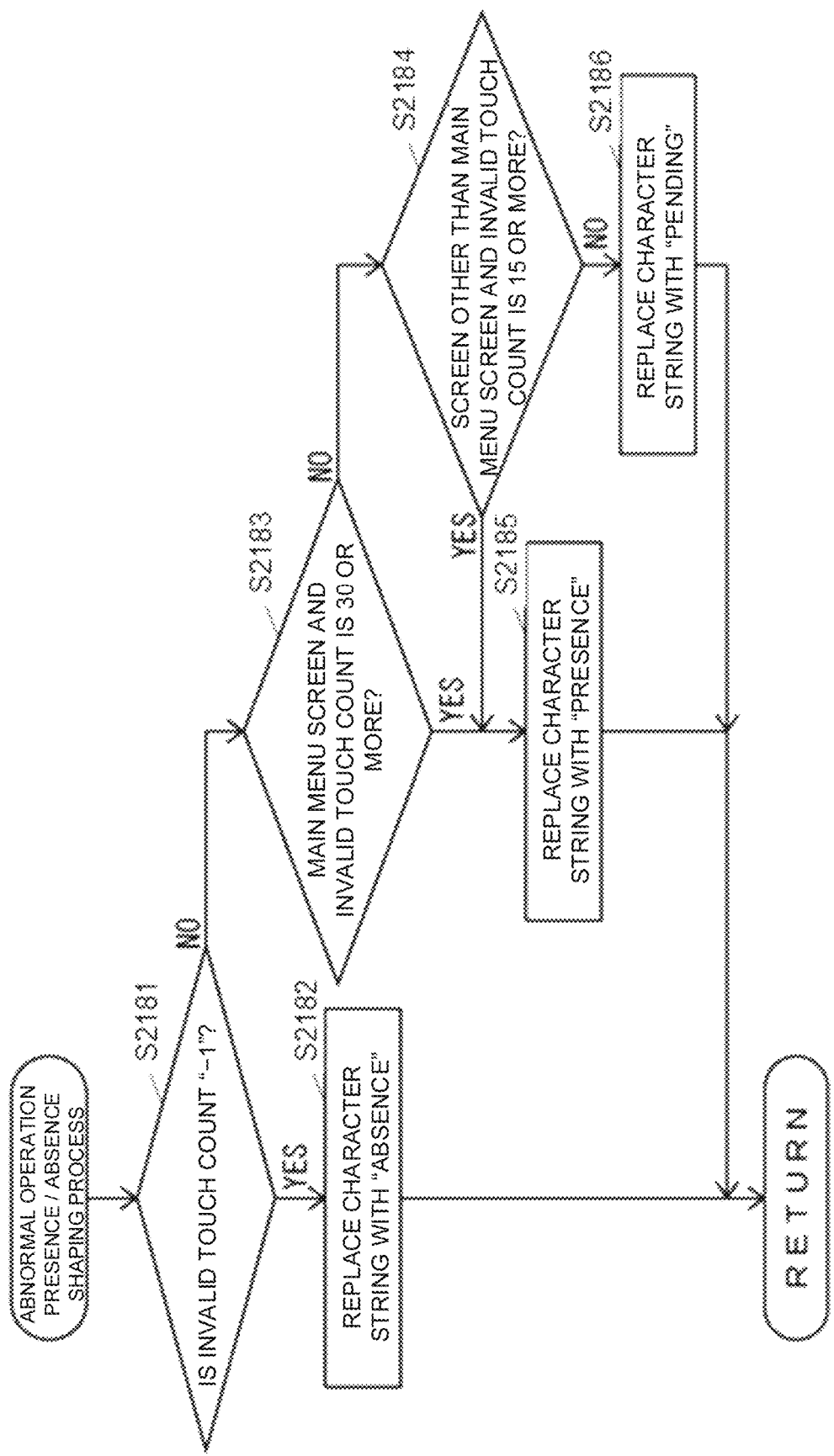
FIG. 22 is a flowchart of an abnormal operation presence/absence shaping process shown in FIG. 18.

FIG. 22 is a flowchart of the abnormal operation presence/absence shaping process shown in FIG. 18.

As shown in FIG. 22, the log management unit 39*c* determines whether the invalid touch count is "−1" based on the character string generated in S2103 (S2181).

When the log management unit 39*c* determines in S2181 that the invalid touch count is "−1", the log management unit 39*c* replaces the character string generated in S2103 with "absence" (S2182), and then ends the operation shown in FIG. 22.

When the log management unit 39*c* determines in S2181 that the invalid touch count is not "−1", the log management unit 39*c* determines whether the screen on the kiosk terminal 30 is the main menu screen 41 and the invalid touch count is 30 or more based on the character string generated in S2103 (S2183).

When the log management unit 39*c* determines in S2183 that the screen on the kiosk terminal 30 is the main menu screen 41 but the invalid touch count is less than 30, or that the screen on the kiosk terminal 30 is not the main menu screen 41, the log management unit 39*c* determines whether the screen on the kiosk terminal 30 is a screen other than the main menu screen 41 and the invalid touch count is 15 or more based on the character string generated in S2103 (S2184).

When the log management unit 39*c* determines in S2183 that the screen on the kiosk terminal 30 is the main menu screen 41 and the invalid touch count is 30 or more, or when the log management unit 39*c* determines in S2184 that the screen on the kiosk terminal 30 is a screen other than the main menu screen 41 and the invalid touch count is 15 or more, the log management unit 39*c* replaces the character string generated in S2103 with "presence" (S2185), and then ends the operation shown in FIG. 22.

When the log management unit 39*c* determines in S2184 that the screen on the kiosk terminal 30 is a screen other than the main menu screen 41 but the invalid touch count is less than 15, the log management unit 39*c* replaces the character string generated in S2103 with "pending" (S186), and then ends the operation shown in FIG. 22.

As shown in FIG. 18, after the process of S2104, the log management unit 39*c* determines whether the character string specified in the immediately preceding abnormal operation presence/absence shaping process of the process of S2104 is the same as the character string specified in the previous abnormal operation presence/absence shaping process of the abnormal operation presence/absence shaping process (S2105).

When the log management unit 39c determines in S2105 that the character strings are not the same, the log management unit 39c determines the character string specified in immediately preceding abnormal operation presence/absence shaping process in the process of S2104 (S2106).

When the log management unit 39c determines in S2106 that the character string specified in the immediately preceding abnormal operation presence/absence shaping process in the process of S2104 is "presence", the log management unit 39c adds the schedule for executing the recovery process to the schedule list 38c (S2107).

When the log management unit 39c determines in S2106 that the character string specified in the immediately preceding abnormal operation presence/absence shaping process in the process of S2104 is "absence", the log management unit 39c deletes the schedule for executing the recovery process from the schedule list 38c (S2108).

When the log management unit 39c determines that the character strings are the same in S2105, determines in S2106 that the character string specified in the immediately preceding abnormal operation presence/absence shaping process in S2104 is "pending", or executes the process of S2107 or S2108, the log management unit 39c then ends the operation shown in FIG. 18.

Next, the operation of the image forming system 10 in the case where an abnormality occurs will be described.

Figure 23:
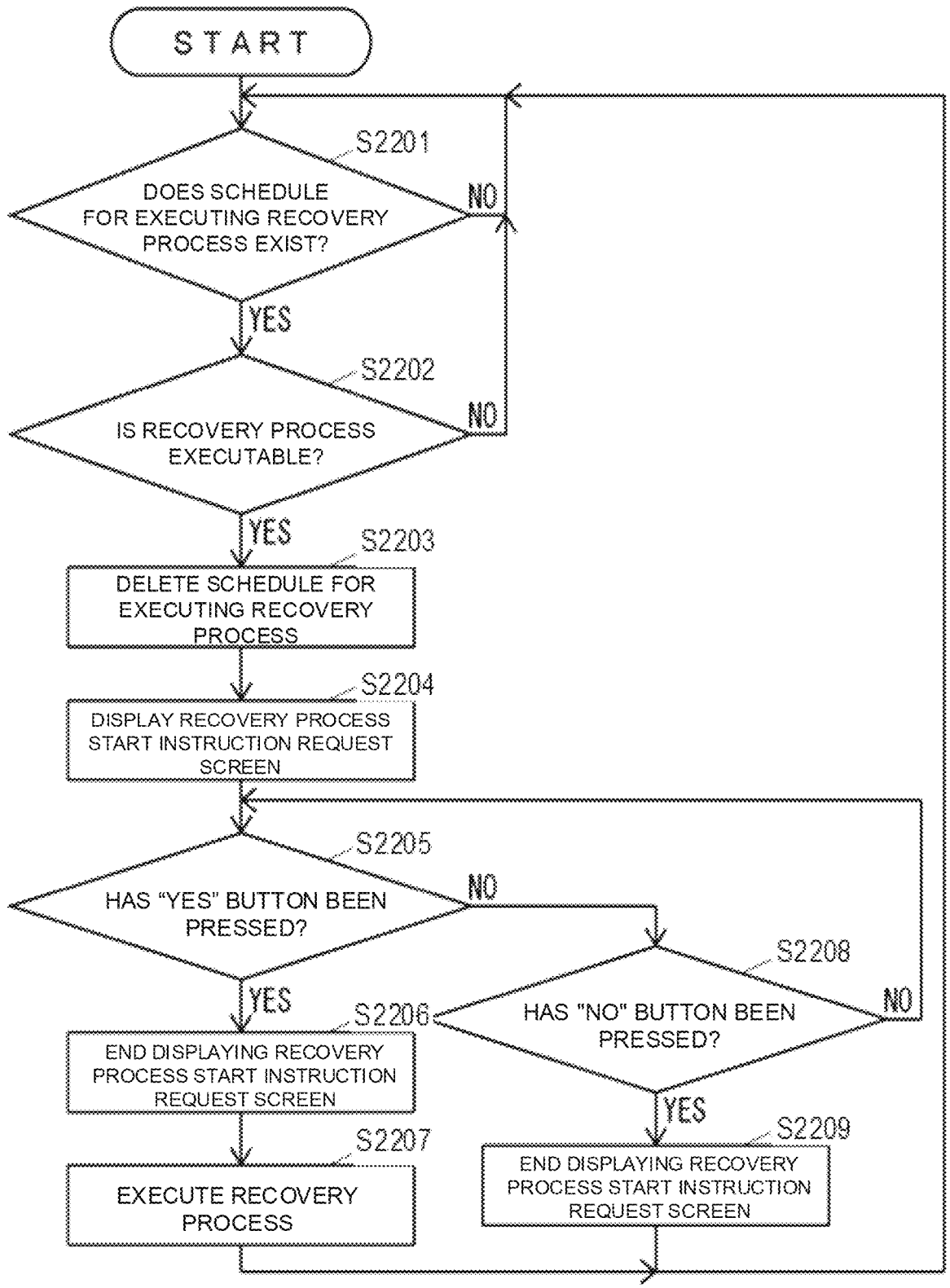
FIG. 23 is a flowchart of the operation of the image forming system 10 in the case where an abnormality occurs according to the second embodiment of the disclosure.

FIG. 23 is a flowchart of the operation of the image forming system 10 in the case where an abnormality occurs.

As shown in FIG. 23, the log management unit 39c determines whether the schedule for executing the recovery process exists in the schedule list 38c until the log management unit 39c determines that the schedule for executing the recovery process exists in the schedule list 38c (S2201).

Figure 24:
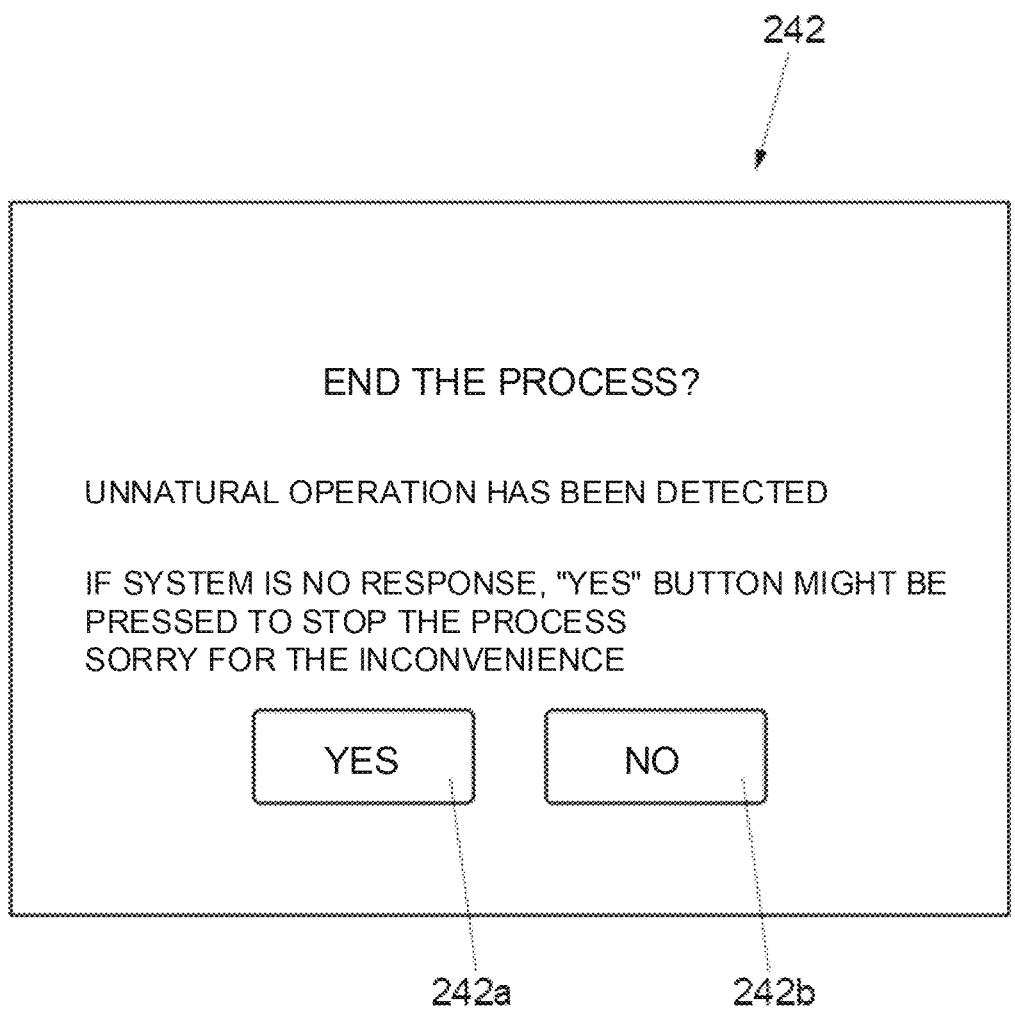
FIG. 24 is a diagram showing an example of a recovery process start instruction request screen displayed in the operation shown in FIG. 23.

When the log management unit 39c determines in S2201 that the schedule for executing the recovery process exists in the schedule list 38c, the log management unit 39c determines whether the recovery process is executable (S2202). For example, the status in which a recovery process start instruction request screen 242 (see FIG. 24) is displayed on the touch panel 31a or the status in which the recovery process is being executed, which will be described later, is not the status in which the recovery process is executable.

When the log management unit 39c determines in S2202 that the recovery process is not executable, the log management unit 39c executes the process of S2201.

When the log management unit 39c determines in S2202 that the recovery process is executable, the log management unit 39c deletes the schedule for executing the recovery process from the schedule list 38c (S2203), and displays, on the touch panel 31a, the recovery process start instruction request screen 242 (see FIG. 24) for requesting the user whether to start the recovery process (S2204). Here, the recovery process start instruction request screen 242 includes a "Yes" button 242a for instructing to start the recovery process (see FIG. 24), and a "No" button 242b for instructing not to start the recovery process (see FIG. 24).

After the process of S2204, the log management unit 39c determines whether the "Yes" button 242a has been pressed (S2205).

When the log management unit 39c determines in S2205 that the "Yes" button 242a has been pressed, the log management unit 39c ends displaying the recovery process start instruction request screen 242 on the touch panel 31a (S2206), executes the recovery process (S2207), and then executes the process of S2201.

When the log management unit 39c determines in S2205 that the "Yes" button 242a has not been pressed, the log management unit 39c determines whether the "No" button 242b has been pressed (S2208).

When the log management unit 39c determines in S2208 that the "No" button 242b has not been pressed, the log management unit 39c executes the process of S2205.

When the log management unit 39c determines in S2208 that the "No" button 242b has been pressed, the log management unit 39c ends displaying the recovery process start instruction request screen 242 on the touch panel 31a (S2209), and then executes the process of S2201.

As described above, the image forming system 10 according to the second embodiment specifies the count of the invalid touches on the touch panel 31a based on the log indicating the touches on the touch panel 31a(S2101). Further, when the count of the invalid touches on the touch panel 31a is equal to or greater than the specific threshold (YES in S2183 or YES in S2184), the image forming system 10 according to the second embodiment detects the freeze of the screen displayed on the touch panel 31a (abnormality of the image forming system 10) (S2185). Therefore, the image forming system 10 according to the second embodiment can achieve a technical effect which detects the complicated abnormality that occurs according to the series of flows.

The image forming system 10 executes the recovery process for recovering from the abnormality (S2207). Therefore, the image forming system 10 can reduce the trouble of the user to cope with the abnormality and quickly recover from the abnormality.

The image forming system 10 provides the threshold value for the invalid touch to detect the freeze on the screen according to the type of the screen (S2183 and S2184). Therefore, the image forming system 10 can appropriately detect the freeze of the screen according to the type of the screen. Note that the image forming system 10 changes the threshold value according to whether the main menu screen 41 is displayed. However, the threshold value may be different between a plurality of screens other than the main menu screen 41.

The image forming system 10 detects the abnormality occurring in the image forming system 10 using the kiosk terminal 30 in the second embodiment. However, the image forming system 10 may detect the abnormality that occurs in the image forming system 10 by using the MFP 20 or by using both the MFP 20 and the kiosk terminal 30. For example, when the image forming system 10 detects the abnormality occurring in the image forming system 10 using both the MFP 20 and the kiosk terminal 30, the image forming system 10 may detect the abnormality occurring in the MFP 20 using the MFP 20 itself, and may detect the abnormality occurring in the kiosk terminal 30 using the kiosk terminal 30 itself.

The image forming apparatus according to the present disclosure is also the MFP in the second embodiment. However, the image forming apparatus according to the present disclosure may be an image forming apparatus other than the MFP, such as a dedicated printer, a dedicated copy machine, a dedicated facsimile machine, or a dedicated scanner.

Next, other embodiments of the present disclosure will be described. A recording medium that records a software program code for realizing the functions of the above-described embodiments of the present disclosure is supplied to a system or an apparatus, and a computer of the system or the apparatus reads out the program code recorded on the recording medium and executes the program code, to realize the configuration of the image forming system of the present disclosure. In this case, the program code itself read from the recording medium realizes the functions of the above-described embodiments, and the recording medium on which the program code is recorded constitutes the present disclosure. Also, the functions of the above-described embodiments are realized by executing the program code read by the computer. However, the functions of the above-described embodiments may be realized by executing part or all of the actual process and the like by an operating system (OS) running on the computer based on the instructions of the program code.

What is claimed is:

1. An image forming system for forming an image, the image forming system comprising:
a storage device configured to store a log of the image forming system; and
a controller configured to determine a type of the log stored in the storage device on a basis of a text described in the log stored in the storage device, change the text in accordance with a determination result of the type, and detect an abnormality of the image forming system based on the changed text,
wherein the controller is configured to control to execute a recovery process of the image forming system according to a detection result of the abnormality.

2. The image forming system according to claim 1,
wherein the image forming system further comprises a communication device that communicates with an external device, and
wherein the controller detects a communication error as the abnormality of the image forming system based on the text described in the log of the communication device.

3. The image forming system according to claim 2,
wherein the controller detects that a predetermined time has elapsed after successful communication but a recovery signal is not yet received as the communication error, based on the text described in the log indicating the successful communication and the log indicating the recovery signal.

4. The image forming system according to claim 1, the image forming system further comprising a touch panel,
wherein the controller detects a freeze of a screen displayed on the touch panel as the abnormality based on the text described in the log indicating a touch on the touch panel.

5. The image forming system according to claim 4,
wherein the controller specifies a count of invalid touches on the touch panel based on the log indicating the touch,
wherein the controller detects the freeze of the screen displayed on the touch panel as the abnormality when the count is equal to or more than a predetermined threshold, and
wherein the predetermined threshold is provided according to a type of the screen.

6. The image forming system according to claim 1,
wherein the controller executes an automatic recovery process as the recovery process.

7. The image forming system according to claim 6,
wherein the controller guides a manual operation for recovering from the abnormality as the recovery process when the abnormality is not recovered by executing the automatic recovery process.

8. The image forming system according to claim 1,
wherein the controller detects the abnormality when the log increases by one.

9. The image forming system according to claim 1,
wherein the log stored in the storage device includes a device log as a log for a device in the image forming system and a service log as a log for a service in the image forming system.

10. The image forming system according to claim 1, the image forming system further comprising:
an image forming apparatus; and
a terminal that is connected to the image forming apparatus and reinforces a function of the image forming apparatus,
wherein the terminal includes the storage device and the controller.

11. The image forming system according to claim 1,
wherein the controller changes the changed text to a predetermined text which specifies a status of an event corresponding to the type of the log, in accordance with the detection result and controls to execute a recovery process of the image forming system on the basis of the predetermined text.

12. A method of controlling an image forming system for forming an image, the method comprising:
storing a log of the image forming system in a storage unit;
determining a type of the log stored in the storage unit on a basis of a text described in the log stored in the storage unit;
changing the text in accordance with a determination result of the type;
detecting an abnormality of the image forming system, based on the changed text; and
controlling to execute a recovery process of the image forming system according to a detection result of the abnormality.

13. The method according to claim 12, further comprising changing the changed text to a predetermined text which specifies a status of an event corresponding to the type of the log, in accordance with the detection result and controlling to execute a recovery process of the image forming system on the basis of the predetermined text.

14. A non-transitory computer-readable recording medium recording a program,
the program, in an image forming system for forming an image including a storage unit that stores a log, causing a computer to function as a controller that determines a type of the log stored in the storage unit on a basis of a text described in the log stored in the storage unit, changes the text in accordance with a determination result of the type, detects an abnormality of the image forming system based on the changed text and controls to execute a recovery process of the image forming system according to a detection result of the abnormality.

15. The computer-readable recording medium according to claim 14, wherein the controller changes the changed text to a predetermined text which specifies a status of an event corresponding to the type of the log, in accordance with the detection result and controls to execute a recovery process of the image forming system on the basis of the predetermined text.

* * * * *